(12) United States Patent
Umesato et al.

(10) Patent No.: US 11,584,864 B2
(45) Date of Patent: Feb. 21, 2023

(54) AQUEOUS INK, INK CARTRIDGE, INK JET RECORDING METHOD AND METHOD FOR PRODUCING AQUEOUS INK

(71) Applicant: CANON KABUSHIKI KAISHA, Tokyo (JP)

(72) Inventors: Toshiyuki Umesato, Kanagawa (JP); Katsuhiro Hayashi, Kanagawa (JP); Tsuyoshi Kasai, Tokyo (JP); Naofumi Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 17/204,551

(22) Filed: Mar. 17, 2021

(65) Prior Publication Data

US 2021/0198504 A1    Jul. 1, 2021

Related U.S. Application Data

(63) Continuation of application No. PCT/JP2019/036880, filed on Sep. 20, 2019.

(30) Foreign Application Priority Data

Sep. 20, 2018    (JP) .............................. JP2018-175720

(51) Int. Cl.
*C09D 11/104*    (2014.01)
*B41J 2/175*    (2006.01)
(Continued)

(52) U.S. Cl.
CPC ......... *C09D 11/104* (2013.01); *B41J 2/17503* (2013.01); *B41M 5/0023* (2013.01);
(Continued)

(58) Field of Classification Search
CPC ..... C09D 11/104; C09D 11/322; C09D 11/30; C09D 167/00; C08G 63/183
See application file for complete search history.

(56) References Cited

U.S. PATENT DOCUMENTS 6,387,442 B1 *    5/2002    Moffat ................. G03G 15/346
427/256
2002/0061959 A1 *    5/2002    Kajimaru ............. C09D 167/00
524/601
(Continued)

FOREIGN PATENT DOCUMENTS

JP    08259871 A    10/1996
JP    09263684 A    10/1997
(Continued)

*Primary Examiner* — John Zimmermann
(74) *Attorney, Agent, or Firm* — Canon U.S.A., Inc., IP Division

(57) ABSTRACT

To provide an aqueous ink having excellent ejection stability and capable of recording an image having excellent abrasion resistance and the like. An aqueous ink for ink jet containing a resin particle, in which the resin particle is formed of a first resin and a second resin, each having a carboxylic acid group, the first resin is a polyester resin not having a crosslinked structure, the second resin is at least one of a polyester resin and an acrylic resin having a crosslinked structure, and the crosslinked structure of the first resin and the second resin is an alkylene oxide group having a repetition number of 1 to 9.

20 Claims, 2 Drawing Sheets

(51) Int. Cl.
*B41M 5/00* (2006.01)
*C08G 63/183* (2006.01)
*C09D 11/322* (2014.01)
*C09D 11/107* (2014.01)

(52) U.S. Cl.
CPC .......... *C08G 63/183* (2013.01); *C09D 11/107* (2013.01); *C09D 11/322* (2013.01)

(56) References Cited

U.S. PATENT DOCUMENTS

| | | | |
|---|---|---|---|
| 2013/0266797 A1* | 10/2013 | Teramoto | C08J 9/00 521/149 |
| 2019/0168182 A1* | 6/2019 | Sato | C08G 18/6692 |
| 2020/0190344 A1* | 6/2020 | Koyama | C09D 11/107 |
| 2021/0292577 A1* | 9/2021 | Hayashi | B41J 2/17503 |

FOREIGN PATENT DOCUMENTS

| | | | |
|---|---|---|---|
| JP | 2011084673 A | 4/2011 | |
| JP | 2014125555 A | 7/2014 | |
| JP | 2017165965 A | 9/2017 | |
| JP | 2017226834 A | 12/2017 | |

* cited by examiner

US 11,584,864 B2

AQUEOUS INK, INK CARTRIDGE, INK JET RECORDING METHOD AND METHOD FOR PRODUCING AQUEOUS INK

CROSS-REFERENCE TO RELATED APPLICATIONS

This application is a Continuation of International Patent Application No. PCT/JP2019/036880, filed Sep. 20, 2019, which claims the benefit of Japanese Patent Application No. 2018-175720, filed Sep. 20, 2018, both of which are hereby incorporated by reference herein in their entirety.

BACKGROUND OF THE INVENTION

Field of the Invention

The present invention relates to an aqueous ink, an ink cartridge, an ink jet recording method and a method for producing an aqueous ink.

Description of the Related Art

In the related art, an ink jet recording apparatus has been widely used as a small printer for home use, but in recent years, the application thereof has been expanded to use in offices, commercial printing, and the like. In these fields, it is required to record an image having higher abrasion resistance than the level required for home use and the like. An ink containing a resin particle formed of two types of polyester resins to improve the abrasion resistance of an image has been investigated (refer to Japanese Patent Application Laid-Open No. 2011-084673). Further, an aqueous ink containing a resin particle formed of a graft polymer having a main chain segment made of a crystalline polyester resin and a side chain segment made of an acrylic resin has been investigated (refer to Japanese Patent Application Laid-Open No. 2014-125555).

When the present inventors recorded an image using the aqueous inks described in Japanese Patent Application Laid-Open No. 2011-084673 and Japanese Patent Application Laid-Open No. 2014-125555, it was found that the image was good in abrasion resistance to some extent, but the ejection stability of the inks was not sufficient.

Therefore, an object of the present invention is to provide an aqueous ink having excellent ejection stability and capable of recording an image having excellent abrasion resistance and a method for preparing the aqueous ink. Another object of the present invention is to provide an ink cartridge using the aqueous ink and an ink jet recording method.

SUMMARY OF THE INVENTION

The above objects are achieved by the following inventions. That is, an aqueous ink according to an aspect of the present invention is an aqueous ink for ink jet including a resin particle, in which the resin particle is formed of a first resin and a second resin, each having a carboxylic acid group, the first resin is a polyester resin having no crosslinked structure, the second resin is at least one of a polyester resin and an acrylic resin having a crosslinked structure and the crosslinked structure for the first resin, and the second resin is an alkylene oxide group having a repetition number of 1 to 9.

Further features of the present invention will become apparent from the following description of exemplary embodiments with reference to the attached drawings.

DESCRIPTION OF THE EMBODIMENTS

Figure 1:
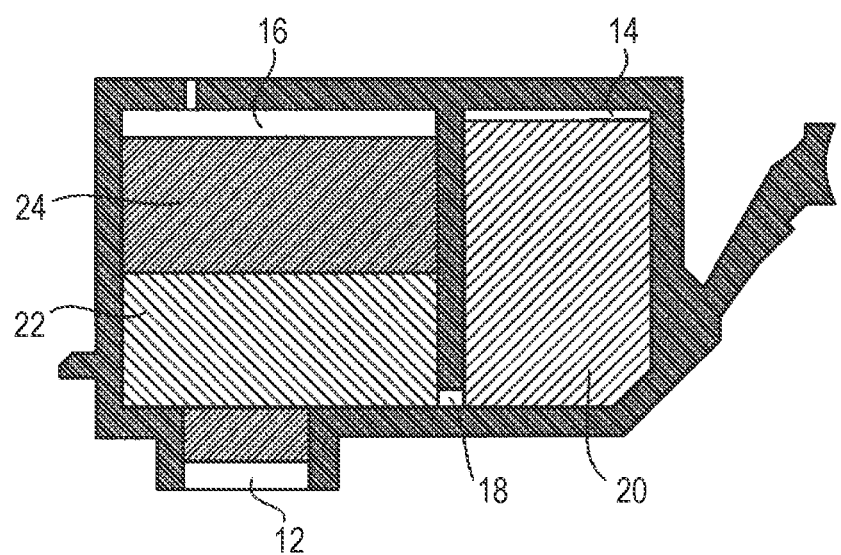
FIG. 1 is a cross-sectional view schematically illustrating an exemplary embodiment of an ink cartridge of the present invention.

The present invention will be described in more detail below with reference to preferred exemplary embodiments. In the present invention, in a case where the compound is a salt, the salt is present in a state dissociated into ions in an ink, which is, however, expressed as "salt is contained" for convenience according to the present invention. Further, an aqueous ink for ink jet may be simply referred to as "ink" in some cases. Unless otherwise specified, the physical property values are values at normal temperature (25° C.), normal pressure (1 atm=101325 Pa) and normal humidity (relative humidity: 50%). In addition, the "unit" means a unit structure corresponding to one monomer, unless otherwise specified. In a case where "(meth)acrylic acid" and "(meth)acrylate" are described, "(meth)acrylic acid" and "(meth)acrylate" respectively indicate "acrylic acid and methacrylic acid" and "acrylate and methacrylate".

A polyester resin includes a unit derived from a polyhydric alcohol and a unit derived from a polyvalent organic acid. A general purpose polyester resin includes a unit derived from a polyhydric alcohol and a unit derived from a polycarboxylic acid. A structure containing an ester bond (—COO—) including a unit derived from a polyhydric alcohol and a unit derived from a polycarboxylic acid may be referred to as an "ester unit".

An oxygen atom constituting a carbonyl group of the ester bond is polarized in $\delta^-$. In addition, since a general recording medium used in an ink jet recording method is neutral to acidic, a hydrogen atom polarized in $\delta^+$ is present. When an ink containing a resin particle formed of a polyester resin is applied to a recording medium, the oxygen atom polarized in $\delta^-$ of the polyester resin and the hydrogen atom polarized in $\delta^+$ of the recording medium are attracted to each other. Thus, the recording medium and the resin particle formed of the polyester resin are easily closely attached to each other. In addition, the polyester resin having a carboxylic acid group is brought into a state in which the molecular chains of the polyester resin are entangled by hydrogen bonds generated between plural carboxylic acid groups in a recording medium. As described above, the abrasion resistance of an image is exhibited by the adhesiveness between the recording medium and the polyester resin and the entanglement of the molecular chains of the polyester resin.

The polyester resin has a hydroxy group of a polyhydric alcohol or a carboxylic acid group of a polycarboxylic acid at the terminal thereof. Since at least a part of the terminal portion of the polyester resin is present on the particle surface of the resin particle formed of the polyester resin, a hydroxy group or a carboxylic acid group, which is a highly hydrophilic group, is present on the particle surface. That is, since the resin particle formed of the polyester resin is present in the aqueous ink with the hydroxy group or the carboxylic acid groups present on the particle surface, it is expected that the dispersion state in the ink is stabilized due to the hydrophilicity of these groups.

However, as a result of the investigation, it has been found that even when the polyester resin is used, the ink ejection stability may not be improved in some cases. In a case where a polyester resin capable of forming particles is used, even when a part of the hydroxy group or the carboxylic acid group at the terminal is present on the particle surface, the hydrophilicity of the resin particle does not increase so much and thus, the dispersion state in the ink is not easily stabilized. When such an ink is ejected from the recording head, the resin particle whose dispersion state is not stable or aggregates thereof is attached to the vicinity of the flow path and the ejection orifice and gradually accumulated. Then, it has been found that as the number of ejections increases, the ink ejection direction is bent by the accumulation and the ink ejection stability is impaired.

The present inventors have investigated that by suppressing the variation in the particle diameter due to environmental changes, such as pH and temperature, which can occur before the ink is ejected from the recording head, the dispersion state of the resin particle is stably maintained and the ejection stability of the ink is improved. As a result, it has been found that the ejection stability can be improved by using the resin particle that is formed of the first resin and the second resin, each of which has a carboxylic acid and has the following constitution. These resins are a first resin which is a polyester resin having no crosslinked structure described later and a second resin which is at least one of a polyester resin and an acrylic resin having a crosslinked structure described later and the crosslinked structure is an alkylene oxide group having a repetition number of 1 to 9. Hereinafter, in a case where the expressions "crosslinked" and "non-crosslinked" are used, this case means that the molecular chains are crosslinked with an alkylene oxide group having a repetition number of 1 to 9 or not crosslinked.

Since the polyester resin and the acrylic resin each have a carboxylic acid group, the hydrophilicity of the resin particle is increased. When the pH of the first resin, which is a non-crosslinked polyester resin, is changed, the state of ion dissociation of the carboxylic acid group is affected and the amount of hydration to the carboxylic acid group is changed. Thus, the variation in the particle diameter tends to easily occur. In addition, since the molecular motion of the first resin increases as the temperature changes, a part of the resin is dissolved in the aqueous ink and the variation in the particle diameter tends to easily occur. Further, as described above, the carboxylic acid group of the first resin which is a polyester resin can cause entanglement of the molecular chains of the polyester resin by hydrogen bonding to improve abrasion resistance. However, since the resin is non-crosslinked, the action is not impaired. In addition, the second resin is crosslinked with an alkylene oxide group having a repetition number of 1 to 9, which is a crosslinking group that is not easily affected by changes in pH and temperature. Therefore, the second resin maintains a three-dimensionally stable shape even when the pH and temperature are changed and thus the variation in the molecular size does not easily occur. In addition, in the resin particle formed of the resin having a crosslinked structure, swelling due to the invasion of the liquid component into the resin particle is easily suppressed. Since the resin particle formed of the first resin and the second resin having such characteristics has a structure in which the second resin whose molecular size is not easily changed is entangled with the first resin, even when the pH and temperature are changed, the variation in the particle diameter does not easily occur and the ink ejection stability is improved.

The ink described in Japanese Patent Application Laid-Open No. 2011-084673 contains a resin particle formed of two type of polyester resins. The resin particle is not crosslinked with an alkylene oxide group having a repetition number of 1 to 9. In addition, the ink described in Japanese Patent Application Laid-Open No. 2014-125555 contains a resin particle formed of a graft polymer having a main chain segment made of a crystalline polyester resin and a side chain segment made of an acrylic resin. The resin that forms the resin particle is a single resin in which an acrylic resin is grafted onto a polyester resin. Each of the polyester resin and the acrylic resin constituting this resin is not designed not to easily cause the variation in the molecular size. Accordingly, when the pH and the temperature are changed, the variation in the particle diameter of each resin particle easily occurs and the ink ejection stability cannot be obtained.

<Ink>

The ink of the present invention is an aqueous ink for ink jet that contains a resin particle formed of a first resin and a second resin (hereinafter, simply referred to as "resin particle" in some cases), each having a carboxylic acid group. Hereinafter, components constituting the ink of the present invention and physical properties of the ink will be described in detail.

(Resin Particle)

The ink contains a resin particle formed of a first resin and a second resin each having a carboxylic acid group. When the resin does not have a carboxylic acid group, the hydrophilicity is insufficient and the dispersion state of the resin particle easily becomes an unstable state, and thus, the ink ejection stability cannot be obtained. The first resin is a polyester resin having no crosslinked structure, the second resin is at least one of a polyester resin and an acrylic resin having a crosslinked structure and the crosslinked structure of the first resin and the second resin is an alkylene oxide group having a repetition number of 1 to 9. The content (% by mass) of the resin particle in the ink is preferably 0.1% by mass or more to 15.0% by mass or less and more preferably 1.0% by mass or more to 10.0% by mass or less based on the total mass of the ink. The resin particle is dispersed in the ink, that is, the resin particle is present in the ink in the form of a resin emulsion. The resin particle may or may not contain a coloring material.

In the present invention, the term "resin particle" refers to a resin that is present in a state in which the resin particle is not dissolved in an aqueous medium constituting the ink and specifically, a resin that can be present in an aqueous medium in a state in which particles whose particle diameter can be measured by a dynamic light scattering method are formed. On the other hand, the "water-soluble resin" refers to a resin that is present in a state of being dissolved in an aqueous medium constituting the ink and specifically, a resin that can be present in an aqueous medium in a state in which particles whose particle diameter can be measured by a dynamic light scattering method are not formed. When the resin particle is expressed as a pair of the "water-soluble resin", the resin is "water-dispersible resin (water-insoluble resin)".

Whether or not a certain resin falls under the above-defined "resin particle" can be determined according to the method shown below. First, a liquid containing a resin to be determined (resin content: 10% by mass) is prepared. Next, this liquid is diluted 10-fold (on the volume basis) with pure water to prepare a sample. Then, in a case where the particle diameter of the resin in the sample is measured by a dynamic light scattering method, when particles having a particle diameter are measured, the resin is determined to be the "resin particle" (that is, "water-dispersible resin"). On the other hand, when particles having a particle diameter are not measured, it is determined that the resin is not "resin particle" (that is, "water-soluble resin"). In this case, the measurement can be performed under the conditions of, for example, a SetZero of 30 seconds, a number of measurements of 3 times, a measurement time of 180 seconds, a shape of real spherical shape and a refractive index of 1.59. As the particle size distribution measuring apparatus, a particle diameter analyzer (for example, trade name "UPA-EX150", manufactured by Nikkiso Co., Ltd.) by a dynamic light scattering method or the like can be used. Of course, the particle diameter analyzer and the measurement conditions are not limited thereto.

In the present invention, regarding another resin, such as a resin dispersant, which can be used in addition to the resin particle formed of the polyester resin, whether or not the resin is the resin particle is also determined in the same manner as described above. Regarding the other resin, whether the other resin is the resin particle or a water-soluble resin can be determined by the same manner as described above. However, in order to make a simple determination, it is preferable to determine the other resin using a liquid containing a resin (resin content: 10% by mass) that is neutralized with an alkali (such as sodium hydroxide and potassium hydroxide) in an amount corresponding to the acid value.

The first resin forming the resin particle is a polyester resin having a carboxylic acid group and does not have a crosslinked structure by an alkylene oxide group having a repetition number of 1 to 9. The second resin forming the resin particle is at least one of a polyester resin and an acrylic resin having a carboxylic acid group and has a crosslinked structure by an alkylene oxide group having a repetition number of 1 to 9. The "crosslinking" in the present specification indicates that the molecular chains of a plurality of resins are bonded by a crosslinked structure (an alkylene oxide group having a repetition number of 1 to 9) different from the molecular chains of these resins.

Specifically, the resin particle has the following constitution (A) or (B). As described above, the expressions "crosslinked" and "non-crosslinked" indicate that the molecular chains are crosslinked with an alkylene oxide group having a repetition number of 1 to 9 or not crosslinked.

(A) Resin particle formed of a first resin which is a non-crosslinked polyester resin having a carboxylic acid group and a second resin which is a crosslinked polyester resin having a carboxylic acid group.

(B) Resin particle formed of a first resin which is a non-crosslinked polyester resin having a carboxylic acid group and a second resin which is a crosslinked acrylic resin having a carboxylic acid group.

As for the polyester resin having a carboxylic acid group as the first resin and the polyester resin having a carboxylic acid group as the second resin, the same resin may be used except for the presence or absence of crosslinking by a specific crosslinked structure and resins having different constitutions in addition to the presence or absence of crosslinking may be used. In addition, each of the first resin and the second resin is a water-dispersible resin and a resin particle produced by integrally granulating both resins may be used. Further, at least one of the first resin and the second resin is a water-soluble resin and a combination of each resin which becomes a resin particle when both resins are integrally granulated to produce particles may be used. However, a state in which the first resin and the second resin are merely allowed to coexist in the ink and these resins are not integrated does not correspond to the "a resin particle formed of the first resin and the second resin" and is not included in the present invention.

[Constituent Material of Resin Particle: Polyester Resin]

The polyester resin is used as the first resin forming the resin particle. The polyester resin can also be used as the second resin forming the resin particle. The polyester resin that forms the resin particle has a carboxylic acid group. That is, the polyester resin has a unit having a carboxylic acid group. Usually, an unreacted hydroxy group or carboxylic acid group is present at the terminal of the polyester resin. In a case where the carboxylic acid group is not present at the terminal of the polyester resin, the carboxylic acid group is present at a portion other than the terminal. In the present invention, the abrasion resistance of an image can be improved by using the interaction between the $\delta^-$-polarized oxygen atom of the polyester resin and the $\delta^+$-polarized hydrogen atom of the recording medium.

[Polyhydric Alcohol]

Examples of the polyhydric alcohol that becomes a unit derived from the polyhydric alcohol and constitutes the polyester resin by reaction include polyhydric alcohols of divalent to tetravalent. Examples of the structure of the polyhydric alcohol include polyhydric alcohols having an aliphatic group, polyhydric alcohols having an aromatic group and sugar alcohols. Specific examples of the polyhydric alcohol include dihydric alcohols such as ethylene glycol [1,2-ethanediol], neopentyl glycol [2,2-dimethyl-1,3-propanediol], 1,3-propanediol, 1,4-butanediol, benzenediol and 2,2-bis(4-hydroxyphenyl)propane [bisphenol A]; trihydric alcohols such as glycerin, trimethylolethane and trimethylolpropane; and tetrahydric alcohols such as pentaerythritol. In addition, as the polyhydric alcohol, an oligomer (a low molecular weight polymer having a molecular weight of 1,000 or less) can also be used.

Since the weight average molecular weight of the polyester resin is easily adjusted, it is preferable to use polyhydric alcohols of divalent or trivalent. From the viewpoint of the structure, it is preferable to use polyhydric alcohols having an aliphatic group and polyhydric alcohols having an aromatic group. As the polyhydric alcohol having an aliphatic group, a linear or branched polyhydric alcohol having an aliphatic group having 1 to 6 carbon atoms is more preferable. Particularly, it is preferable to use ethylene glycol, neopentyl glycol, bisphenol A and glycerin, and it is also preferable to use two or more of these in combination. In a case where polyhydric alcohols having an aliphatic group is used, it is preferable to use the polyhydric alcohols as follows. That is, the proportion of the unit derived from the "linear or branched polyhydric alcohol having an aliphatic group having 1 to 6 carbon atoms" in the units derived from the polyhydric alcohols having an aliphatic group in the polyester resin is preferably 70% by mole or more. The proportion is more preferably 100% by mole.

[Polycarboxylic Acid]

Examples of the polycarboxylic acid that becomes a unit derived from the polycarboxylic acid and constitutes the polyester resin by reaction include polycarboxylic acids of divalent to tetravalent. Examples of the structure of the polycarboxylic acid include polycarboxylic acids having an aliphatic group, polycarboxylic acids having an aromatic group and nitrogen-containing polycarboxylic acids. Specific examples of the polycarboxylic acid include divalent carboxylic acids such as glutaric acid, adipic acid, terephthalic acid, isophthalic acid and 2,6-naphthalenedicarboxylic acid; trivalent carboxylic acids such as trimellitic acid; and tetravalent carboxylic acids such as ethylenediaminetetraacetic acid. In addition, as the polycarboxylic acid, an oligomer (a low molecular weight polymer having a molecular weight of 1,000 or less) can also be used.

Since the weight average molecular weight and the acid value of the polyester resin are easily adjusted, it is preferable to use polycarboxylic acids of divalent or trivalent. From the viewpoint of the structure, it is preferable to use carboxylic acids having an aliphatic group and carboxylic acids having an aromatic group. Particularly, it is preferable to use adipic acid, terephthalic acid, isophthalic acid and trimellitic acid and it is also preferable to use two or more of these in combination.

The polyester resin synthesized by using a polyhydric alcohol or polycarboxylic acid having a low molecular weight has more ester bonds contained in the molecular chain compared to a case where a high molecular weight raw material is used and thus excellent abrasion resistance can be obtained. Accordingly, the molecular weight of the polyhydric alcohol is preferably 50 or more to 300 or less and the molecular weight of the polycarboxylic acid is preferably 100 or more to 300 or less.

The valences of the polyhydric alcohol and the polycarboxylic acid are preferably divalent or trivalent. When the valence is tetravalent or higher, the polyester resin to be synthesized has many branches and easily has a three-dimensionally complicated structure. In this case, the polyester resin tends to be not easily brought into a state in which the molecular chains of the polyester resin are entangled in a recording medium and the effect of further improving the abrasion resistance of an image may not be sufficiently obtained in some cases.

It is preferable that a unit having an aromatic group is present in the polyester resin. The polyester resin in which a unit having an aromatic group is present is easily brought into a state in which the molecular chains of the polyester resin are entangled in a recording medium due to the hydrophobic interaction between the aromatic groups and the abrasion resistance of an image can be further improved. The proportion (% by mass) of the unit having an aromatic group in the polyester resin is preferably 25% by mass or more to 50% by mass or less based on the total mass of the resin. The proportion (% by mass) of the unit having no aromatic group in the polyester resin is preferably 50% by mass or more to 75% by mass or less based on the total mass of the resin.

[Crosslinking Agent]

In a case where a polyester resin is used as the second resin, the crosslinked structure which is an alkylene oxide group having a repetition number of 1 to 9 is incorporated into the resin. The crosslinked structure can be incorporated into the resin by reacting a compound having both an alkylene oxide group having a repetition number of 1 to 9 and two or more glycidyl groups, which is a crosslinking agent, with a polyester resin having a carboxylic acid group. The proportion (% by mass) of the alkylene oxide group having a repetition number of 1 to 9 in the polyester resin as the second resin is preferably 1% by mass or more to 10% by mass or less based on the total mass of the resin.

Examples of the compound having both an alkylene oxide group having a repetition number of 1 to 9 and two or more glycidyl groups, which can be used as a crosslinking agent for the polyester resin, include (poly)alkylene glycol diglycidyl ethers such as ethylene glycol diglycidyl ether, diethylene glycol diglycidyl ether, propylene glycol diglycidyl ether and dipropylene glycol diglycidyl ether; and diglycidyl ethers of polyhydric alcohols such as neopentyl glycol diglycidyl ether and 1,6-hexanediol diglycidyl ether. Among these, (poly)alkylene glycol diglycidyl ethers are preferable. The alkylene oxide group is preferably an ethylene oxide group, a propylene oxide group, or a butylene oxide group and more preferably an ethylene oxide group.

[Physical Properties of Polyester Resin]

The acid value of the polyester resin is preferably 3 mgKOH/g or more to 30 mgKOH/g or less and more preferably 3 mgKOH/g or more to 10 mgKOH/g or less. The weight average molecular weight of the polyester resin is preferably 15,000 or more to 70,000 or less.

[Constituent Material of Resin Particle: Acrylic Resin]

An acrylic resin can be used as the second resin forming the resin particle. As the second resin, an acrylic resin is preferable to a polyester resin. The acrylic resin has a carboxylic acid group. That is, the acrylic resin has a unit having a carboxylic acid group. The acrylic resin preferably has a unit having no carboxylic acid group in addition to the unit having a carboxylic acid group.

Examples of the monomer which becomes a unit having a carboxylic acid group and constitutes the acrylic resin by reaction include monomers having a carboxylic acid group such as (meth)acrylic acid, itaconic acid, maleic acid and fumaric acid. Among these, (meth)acrylic acid is preferable. These monomers may be any of an anhydride type, an acid type and a salt type and examples of the counter ion in the salt type include lithium, sodium, potassium, ammonium and organic ammonium. The proportion (% by mass) of the unit having a carboxylic acid group in the acrylic resin is preferably 0.1% by mass or more to 10% by mass or less and more preferably 1% by mass or more to 10% by mass or less based on the total mass of the resin.

Examples of the monomer which becomes a unit having no carboxylic acid group and constitutes the acrylic resin by reaction include alkyl (meth)acrylates such as methyl (meth)acrylate, butyl (meth)acrylate, lauryl (meth)acrylate and hexadecyl (meth)acrylate; alkylate (meth)acrylates having a hydroxy group such as hydroxyethyl (meth)acrylate; (meth)acrylates having a (poly)alkylene oxide group such as polyethylene glycol monomethacrylate; monomers having an aromatic group such as styrene, α-methylstyrene, allylbenzene and benzyl (meth)acrylate; monomers having a sulfonic acid group such as allyl sulfonic acid, vinyl sulfonic acid and 4-sulfobutyl (meth)acrylate; and monomers having a phosphonic acid group such as ethyl 2-phosphonate (meth)acrylate. The monomer having a sulfonic acid group and a phosphonic acid group may be any of an anhydride, an acid type and a salt type and examples of the counter ion in the salt type include lithium, sodium, potassium, ammonium and organic ammonium. Among these, alkyl (meth)acrylates and monomers having an aromatic group are preferable and those having no acid group are more preferable. The proportion (% by mass) of the unit having no carboxylic acid group in the acrylic resin is preferably 80% by mass or more to 95% by mass or less based on the total mass of the resin.

It is preferable that a unit having an aromatic group is present in the acrylic resin. The acrylic resin in which the unit having an aromatic group is present is easily brought into a state of being entangled with the first resin in a recording medium due to the hydrophobic interaction and the abrasion resistance of an image can be further improved.

The proportion (% by mass) of the unit having an aromatic group in the acrylic resin is preferably 25% by mass or more to 50% by mass or less based on the total mass of the resin.
[Crosslinking Agent]

In the acrylic resin, a crosslinked structure which is an alkylene oxide group having a repetition number of 1 to 9 is incorporated into the resin.

Examples of a method for incorporating the crosslinked structure into the acrylic resin include the following methods. (1) An acrylic resin having the above crosslinked structure is synthesized by using a monomer having both an alkylene oxide group having a repetition number of 1 to 9 and two or more ethylenically unsaturated bonds in addition to the monomer having a carboxylic acid group. (2) After synthesizing an acrylic resin (which does not have the above crosslinked structure) using a monomer having a carboxylic acid group or the like, a compound having both an alkylene oxide group having a repetition number of 1 to 9 and two or more glycidyl groups is reacted to synthesize an acrylic resin having the above crosslinked structure. The proportion (% by mass) of the alkylene oxide group having a repetition number of 1 to 9 in the acrylic resin as the second resin is preferably 1% by mass or more to 15% by mass or less based on the total mass of the resin.

Examples of the monomer having both an alkylene oxide group having 1 to 9 repetitions and two or more ethylenically unsaturated bonds, which can be used as a crosslinking agent for the acrylic resin, include monomers having two ethylenically unsaturated bonds such as ethylene glycol di(meth)acrylate, diethylene glycol di(meth)acrylate and polyethylene glycol di(meth)acrylate; monomers having three ethylenically unsaturated bonds such as pentaerythritol tri(meth)acrylate and trimethylolpropane tri(meth)acrylate; and monomers having four ethylenically unsaturated bonds such as ditrimethylolpropane tetra(meth)acrylate and pentaerythritol tetra(meth)acrylate. Among these, (poly)alkylene glycol di(meth)acrylates are preferable. The alkylene oxide group is preferably an ethylene oxide group, a propylene oxide group, or a butylene oxide group and more preferably an ethylene oxide group.

Examples of the compound having both an alkylene oxide group having a repetition number of 1 to 9 and two or more glycidyl groups, which can be used as a crosslinking agent for the acrylic resin, include (poly)alkylene glycol diglycidyl ethers such as ethylene glycol diglycidyl ether, diethylene glycol diglycidyl ether, propylene glycol diglycidyl ether and dipropylene glycol diglycidyl ether; and diglycidyl ethers of polyhydric alcohols such as neopentyl glycol diglycidyl ether and 1,6-hexanediol diglycidyl ether. Among these, (poly)alkylene glycol diglycidyl ethers are preferable. The alkylene oxide group is preferably an ethylene oxide group, a propylene oxide group, or a butylene oxide group and more preferably an ethylene oxide group.
[Physical Properties of Acrylic Resin]

The acid value of the acrylic resin is preferably 5 mgKOH/g or more to 50 mgKOH/g or less and more preferably 10 mgKOH/g or more to 35 mgKOH/g or less. The acid value of the acrylic resin is preferably higher than the acid value of the first polyester resin. The weight average molecular weight of the acrylic resin is preferably 15,000 or more to 70,000 or less.
[Compound Represented by Formula (1)]

The resin particle formed of the polyester resin preferably contains a compound represented by Formula (1). That is, it is preferable that the resin particle has a compound represented by Formula (1) inside. Since the compound represented by Formula (1) interacts with the hydrophobic portion of the polyester resin, the action of immobilizing the molecular chain of the polyester resin by the hydrophobic interaction through the compound represented by Formula (1) is exhibited. Therefore, the dissolution of the polyester resin in the aqueous ink is suppressed in the ink and the ejection stability can be further improved. In addition, since the cohesiveness of the polyester resin is increased in an image, the abrasion resistance can be further improved. A state in which the resin particle has the compound represented by Formula (1) inside refers to a state in which the compound represented by Formula (1) is present inside the three-dimensional structure formed by entangling the polyester resin.

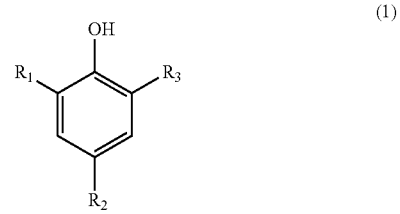

(1)

In Formula (1), $R_1$, $R_2$ and $R_3$ each independently represent a hydrogen atom or an alkyl group having 1 to 4 carbon atoms.

In Formula (1), $R_1$, $R_2$ and $R_3$ each independently represent a hydrogen atom or an alkyl group having 1 to 4 carbon atoms. Examples of the alkyl group having 1 to 4 carbon atoms include a methyl group, an ethyl group, an n-propyl group, an iso-propyl group, an n-butyl group, an iso-butyl group, a t-butyl group and a sec-butyl group. Among these, a methyl group and a t-butyl group are preferable from the viewpoint of more efficiently causing an interaction with the hydrophobic portion of the polyester resin. Particularly, it is preferable that the compound represented by Formula (1) is 2,6-di-t-butyl-p-cresol (also known as dibutylhydroxytoluene, BHT).

The proportion (ppm) of the compound represented by Formula (1) in the resin particle is preferably 100 ppm or more to 1,000 ppm or less based on the total mass of the resin particle. That is, it is preferable that a value of [mass of compound represented by Formula (1)/(mass of compound represented by Formula (1)+mass of resin particle)×$10^6$] in the resin particle is 100 ppm or more to 1,000 ppm or less. When the proportion is less than 100 ppm, it is difficult to sufficiently immobilize the molecular chain of the polyester resin due to the hydrophobic interaction, the dissolution of the polyester resin in the aqueous ink cannot be sufficiently suppressed and the effect of further improving the ejection stability may not be sufficiently obtained in some cases. On the other hand, when the proportion is more than 1,000 ppm, the compound represented by Formula (1) is easily unevenly distributed inside the resin particle due to the hydrophobic interaction between the particles of the compound. Then, since the polyester resin is not easily uniformly present over the entire image, the effect of further improving the abrasion resistance may not be sufficiently obtained in some cases.

The proportion of the compound represented by Formula (1) in the resin particle can be calculated as follows. First, the resin particle is collected from the liquid containing the ink and the resin particle. After measuring the mass of the resin particle, the resin particle is added to an organic solvent (such as tetrahydrofuran) and stirred for about 24 hours to prepare a sample. For this sample, the resin remaining undissolved is collected with a filter (stainless steel mesh) having an appropriate pore diameter and the mass is measured. The collected resin is the second resin having the crosslinked structure. The filtrate was collected. As the filter, for example, a 400-mesh wire mesh (a filter in which 400 stainless steel wires each are woven vertically and horizontally in a 1-inch square) can be used. On the other hand, the collected filtrate contains the first resin which does not have a crosslinked structure and is dissolved in tetrahydrofuran and the compound represented by Formula (1). The compound represented by Formula (1) and the first resin are quantified by performing analysis by gel permeation chromatography, liquid chromatography and the like. Then, the proportion is calculated from the mass of the resin particle and the second resin measured in advance and the quantitative values of the compound represented by Formula (1) and the first resin.

[Physical Properties of Resin Particle]

Various suitable physical properties of the resin particle will be described.

[Proportion of Each Resin]

The proportion (% by mass) of the second resin in the resin forming the resin particle is preferably 30% by mass or more to 80% by mass or less based on the total mass of the resin. When the proportion is less than 30% by mass, the proportion of the crosslinked resin is too small, so that the influence of the variation in the particle diameter of the non-crosslinked resin tends to increase and thus a high level of ink ejection stability may not be sufficiently obtained in some cases. On the other hand, when the proportion is more than 80%, the proportion of the crosslinked resin is too large, so that the molecular motion is reduced, the molecular chains of the polyester resin are not easily entangled and thus the effect of further improving the abrasion resistance of an image may not be sufficiently obtained in some cases. The proportion (% by mass) of the first resin in the resin forming the resin particle is preferably 20% by mass or more to 70% by mass or less based on the total mass of the resin. In addition, the resin particle formed only of the first resin and the second resin are particularly preferable.

The proportion of each resin in the resin forming the resin particle can be calculated as follows. First, the resin particle is collected from the liquid containing the ink and the resin particle. After measuring the mass of the resin particle, the resin particle is added to an organic solvent (such as tetrahydrofuran) and stirred for about 24 hours to prepare a sample. For this sample, the resin remaining undissolved is collected by a filter (stainless steel mesh) having an appropriate pore diameter. As the filter, for example, a 400-mesh wire mesh (a filter in which 400 stainless steel wires each are woven vertically and horizontally in a 1-inch square) can be used. The collected resin is the second resin that is not dissolved since the resin has a crosslinked structure. A difference between the mass of the second resin and the mass of the resin particle is the mass of the first resin dissolved in the organic solvent since the first resin does not have a crosslinked structure. The proportion is calculated from these masses.

[Carboxylic Acid Group Present of Particle Surface of Resin Particle]

In the resin particle formed of the first resin and the second resin, the amount of the carboxylic acid groups present on the particle surface is preferably 25 μmol/g or more to 250 μmol/g or less. This value represents the density (micromolar unit) of carboxylic acid groups present on the particle surface of the resin particle per unit mass of the resin particle. When the amount of carboxylic acid groups present on the particle surface is less than 25 μmol/g, a high level of ink ejection stability may not be sufficiently obtained in some cases. This is because the repulsion of the electric charge generated between the plurality of carboxylic acid groups is weak, the dispersion state of the resin particle is not easily stably maintained and the resin particle is easily accumulated near the flow path or the ejection orifice. On the other hand, when the amount of carboxylic acid groups present on the particle surface is more than 250 μmol/g, a high level of ink ejection stability may not be sufficiently obtained in some cases. This is because the concentration of the counter ion of the carboxylic acid group in the ink becomes high, the resin particle is easily aggregated and the resin particle is easily accumulated near the flow path or the ejection orifice. The amount of carboxylic acid groups present on the particle surface can be measured by colloidal titration using a potential difference. In addition, the acid value X (mgKOH/g) and the amount Y (μmol/g) of carboxylic acid groups can be converted based on Formula $X=Y\times 56.1/1{,}000$. The amount of anionic groups other than the carboxylic acid group such as a sulfonic acid group present on the particle surface is preferably 5 μmol/g or less and more preferably 0 μmol/g.

[Weight Average Molecular Weight]

The weight average molecular weight of the first resin is preferably 15,000 or more to 70,000 or less. The weight average molecular weight can be measured by gel permeation chromatography as a value in terms of polystyrene. In addition, since the crosslinked second resin is not easily dissolved in an organic solvent, it is difficult to prepare a sample for measuring the weight average molecular weight. However, it can be confirmed that the resin has a crosslinked structure due to the presence of an insoluble component in the organic solvent.

[Particle Diameter of Resin Particle]

A volume-based cumulative 50% particle diameter of the resin particle is preferably 50 nm or more to 200 nm or less. In a case of considering a certain amount of the resin particle, the smaller the particle diameter, the larger the specific surface area, and the larger the particle diameter, the smaller the specific surface area. When the cumulative 50% particle diameter is less than 50 nm, a high level of ink ejection stability may not be sufficiently obtained in some cases. This is because the specific surface area of the resin particle is large, the contact amount of the resin particle with the aqueous medium constituting the ink is increased and the first resin forming the resin particle is gradually dissolved in the aqueous ink, so that the viscosity of the ink is easily increased. On the other hand, when the cumulative 50% particle diameter is more than 200 nm, the dispersion state of the resin particle is not easily maintained stably and the resin particle is easily accumulated near the flow path or the ejection orifice. Thus, a high level of ink ejection stability may not be sufficiently obtained in some cases. A volume-based cumulative 90% particle diameter of the resin particle is preferably 80 nm or more to 300 nm or less.

A ratio of the volume-based cumulative 50% particle diameter of the resin particle with respect to the volume-based cumulative 90% particle diameter of the resin particle is preferably 0.6 times or more. When the ratio is less than 0.6 times, the resin particle having a wide particle diameter distribution and significantly different particle diameters are present. When the resin particle with a large particle diameter collides with the resin particle with a small particle diameter, the resin particle is aggregated by to so-called heteroaggregation and easily accumulated near the flow path and the ejection orifice and thus a high level of ink ejection stability may not be sufficiently obtained in some cases. The ratio is preferably 0.8 times or less.

The volume-based cumulative 50% particle diameter and the volume-based cumulative 90% particle diameter of the resin particle refer to particle diameters at which the particle diameter become 50% and 90% when the particle diameters are integrated from the small particle diameter side based on the total volume of the particles to be measured in the particle diameter integration curve. $D_{50}$ and $D_{90}$ of the resin particle can be measured by a dynamic light scattering method under the same conditions as the above-mentioned determination of whether or not the resin is the resin particle.

[Method for Producing Resin Particle]

A method for producing the resin particle is not limited as long as the resin particle described above can be obtained. For example, first, the following treatment (A) or (B) is performed, that is, a polyester resin is synthesized and granulated as necessary.

(A) By synthesizing a polyester resin and then granulating the polyester resin, a resin particle formed of a polyester resin having a carboxylic acid group is obtained.

(B) The polyester resin is synthesized to obtain a polyester resin having a carboxylic acid group without the granulation of (1).

Next, the following treatment (C), (D) or (E) is performed to obtain a resin particle. For the sake of simplicity, a product obtained in (A) or (B) described above is referred to as "polyester".

(C) A part of the carboxylic acid group of the polyester is crosslinked with a compound having both an alkylene oxide group having a repetition number of 1 to 9 and two or more glycidyl groups.

(D) In the presence of the polyester, a monomer that is a raw material for an acrylic resin is polymerized to synthesize an acrylic resin having a carboxylic acid group and then a part of the carboxylic acid group is crosslinked using a compound having both an alkylene oxide group having a repetition number of 1 to 9 and two or more glycidyl groups. In this case, the crosslinked structure is mainly incorporated in the acrylic resin, but the crosslinked structure can also be incorporated in a part of the polyester resin.

(E) In the presence of the polyester, a monomer that is a raw material for an acrylic resin and includes a monomer having both an alkylene oxide group having a repetition number of 1 to 9 and two or more ethylenically unsaturated bonds is polymerized to synthesize a crosslinked acrylic resin. In this case, the crosslinked structure is incorporated in the acrylic resin.

The polyester resin can be synthesized as follows ((A) and (B) described above). A polyhydric alcohol and a polycarboxylic acid are reacted (esterification reaction). As necessary, any of a polyhydric alcohol and a polycarboxylic acid is added to carry out a transesterification reaction for cleaving a part of the ester bond of a polyester resin. Thus, the molecular weight of the polyester resin is adjusted. The polyester resin can be obtained through such stages.

The polyester resin having a carboxylic acid group can be obtained, for example, as follows. In the esterification reaction, a method for adjusting the amount of the raw material used so that the number of moles of the carboxylic acid group of the polycarboxylic acid is larger than the number of moles of the hydroxy group of the polyhydric alcohol can be used. In addition, a method for using the polycarboxylic acid in the transesterification reaction can be used.

The esterification reaction is carried out in an atmosphere of an inert gas such as nitrogen gas. The reaction temperature in the esterification reaction is preferably 180° C. to 260° C. The reaction time in the esterification reaction is preferably 2.5 to 10 hours and more preferably 4 to 6 hours.

By reducing the pressure in the reaction system during the esterification reaction, the water generated in the esterification reaction may be discharged to the outside of the system to promote the esterification (dehydration condensation) reaction. The reaction under reduced pressure is carried out in an atmosphere of an inert gas such as nitrogen gas, following the esterification reaction. The reaction temperature under reduced pressure is preferably 220° C. to 280° C. The reaction time under reduced pressure is preferably 2.5 to 10 hours and more preferably 4 to 6 hours. The degree of pressure reduction (degree of vacuum) is preferably 1 Pa or more to 130 Pa or less. However, when the degree of pressure reduction is too low, the reaction efficiency is decreased and the weight average molecular weight of the polyester resin is reduced. Therefore, it is preferable to adjust the degree of pressure reduction according to the desired reaction conditions. It is preferable that the pressure is gradually reduced over a period of about 60 to 180 minutes from the atmospheric pressure (101325 Pa) to 130 Pa or less.

The transesterification reaction is carried out to adjust the molecular weight of the polyester resin by adding any of a polyhydric alcohol and a polycarboxylic acid to cleave a part of the ester bond of the polyester resin. From the viewpoint of efficiently obtaining the polyester resin having a carboxylic acid group, the transesterification reaction is preferably carried out using a polycarboxylic acid. In addition, since it is easy to adjust the weight average molecular weight and the acid value of the polyester resin in a well-balanced manner, it is preferable to carry out the transesterification reaction using trimellitic acid (which may be an anhydride).

The transesterification reaction is also carried out in an atmosphere of an inert gas such as nitrogen gas, following the esterification reaction. The reaction temperature in the transesterification reaction is preferably 180° C. to 260° C. The reaction time in the transesterification reaction is preferably 1 to 5 hours. The transesterification reaction can be carried out in the presence of a catalyst or a heat stabilizer. Examples of the catalyst include zinc acetate, antimony trioxide, tetra-n-butyl titanate and n-butyl hydroxyoxytin. The amount (mol) of the catalyst used is preferably $1 \times 10^{-1}$ mol to $20 \times 10^{-4}$ mol with respect to 1 mol of the polyhydric alcohol or the polycarboxylic acid. Examples of the heat stabilizer include acids such as phosphoric acid and acid esters such as triethyl phosphate.

It is preferable that the polyester resin synthesized as described above is used in the next steps ((B), (C), (D) and (E) described above) after being formed into an appropriate form by pressurization, pulverization or the like. Since the resin particle is used as a constituent component of the aqueous ink, it is preferable to granulate the resin particle to be in a state of a dispersion liquid in which the resin particle is dispersed in an aqueous liquid medium (a liquid containing the resin particle). The aqueous liquid medium mainly contains water such as deionized water, ion exchange water and distilled water and may contain a water-soluble organic solvent as necessary. The aqueous liquid medium preferably has a water content of 50% by mass or more and it is also preferable to use water that does not contain a water-soluble organic solvent.

Examples of a method for granulating the polyester resin to form the resin particle formed of the polyester resin include a dispersion method and a phase inversion (emulsification) method. Examples of the dispersion method include the following (1) and (2). (1) There is a method for dispersing a polyester resin by adding a solution in which a polyester resin is dissolved in an organic solvent to an aqueous liquid medium. In addition, (2) there is a method for dispersing a polyester resin by adding the polyester resin to an organic solvent, further adding an aqueous liquid medium, and mixing the components. As the phase inversion (emulsification) method, a method in which in a process of adding an aqueous liquid medium to a solution in which a polyester resin is dissolved in an organic solvent to perform phase inversion from an organic solvent phase to an aqueous phase, the polyester resin is precipitated in the form of particles may be used. In either method, it is preferable to adjust the particle diameter of the resin particle formed of the polyester resin by granulating the resin particle while applying an appropriate shearing force using a known disperser.

Since the carboxylic acid group present on the particle surface can be adjusted with high accuracy, it is preferable to produce the resin particle by the phase inversion (emulsification) method. Hereinafter, the method for producing the resin particle by the phase inversion (emulsification) method will be described.

The polyester resin is dissolved in an organic solvent capable of dissolving the polyester resin. Examples of the organic solvent include ethers such as tetrahydrofuran and dibutyl ether, ketones such as acetone and methyl ethyl ketone and alcohols such as isopropanol. In this step, when only an organic solvent (such as methyl ethyl ketone) that has low solubility in water and is immiscible at an arbitrary proportion is used, it may be difficult to adjust the amount of carboxylic acid groups present on the particle surface within a predetermined range in some cases. Accordingly, as the organic solvent, ethers such as tetrahydrofuran are preferably used since the solvent can be miscible with water at an arbitrary proportion. Ethers such as tetrahydrofuran are also preferable from the viewpoint of excellent solubility of the polyester resin. In a case where the resin particle contains the compound represented by Formula (1) described above, it is preferable to add the compound represented by Formula (1) in this step.

Next, the aqueous liquid medium is gradually added to the solution of the polyester resin obtained above to precipitate the resin particle formed of the polyester resin. Since the dispersion state of the resin particle formed of the polyester resin can be maintained stable, it is preferable to add a base before or during the addition of the aqueous liquid medium. Examples of the base include alkali metal hydroxides such as sodium hydroxide and potassium hydroxide and ammonia, and these are preferably added in the form of an aqueous solution. There are cations in the system to which a base is added. In an attempt to neutralize the cation, the carboxylic acid group of the polyester resin is granulated in a state of being located on the particle surface, so that the resin particle having a carboxylic acid group on the particle surface can be formed. That is, when the amount of the base in the system is adjusted, the amount of carboxylic acid groups present on the particle surface of the resin particle can be accurately adjusted. When the amount of the base is large, the amount of carboxylic acid groups on the particle surface of the resin particle is increased and when the amount of the base is small, the amount of carboxylic acid groups on the particle surface of the resin particle is reduced. The amount of the base used can be controlled by controlling a neutralization rate (% by mole) based on the acid value of the polyester resin. As the amount of the aqueous liquid medium added increases, the initially transparent solution becomes cloudy and is emulsified and the resin particle formed of the polyester resin is formed. The particle diameter and the particle size distribution of the resin particle formed of the polyester resin can be controlled by the content of the polyester resin in the solution of the polyester resin, the addition rate of the aqueous liquid medium, the shearing force at the time of dispersion and the like.

With respect to the emulsion thus obtained, the organic solvent is distilled off under reduced pressure and as necessary, the emulsion is filtered through a filter (stainless steel mesh) having an appropriate pore diameter or the like to remove coarse particles. Then, by adjusting the content of the resin particle by adding water, a liquid containing the resin particle (an aqueous dispersion liquid of the resin particle) can be prepared. The water used for adjusting the content is preferably deionized water, ion exchange water, or distilled water.

The method for producing the resin particle by integrating the second resin having a crosslinked structure with respect to the first resin (polyester) thus obtained will be described.

Only a part of the carboxylic acid group of the polyester obtained above is crosslinked using the compound (crosslinking agent) having both an alkylene oxide group having a repetition number of 1 to 9 and two or more glycidyl groups to synthesize the second resin ((C) described above). Specifically, the compound having both an alkylene oxide group having a repetition number of 1 to 9 and two or more glycidyl groups is added to the liquid containing polyester and crosslinked. At the time of crosslinking, the amount of the raw material used is adjusted so that the number of moles of the glycidyl group of the crosslinking agent is smaller than the number of moles of the carboxylic acid group of the polyester. The reaction temperature in the crosslinking reaction is preferably 60° C. to 100° C. The reaction time in the crosslinking reaction is preferably 1 to 5 hours. The progress of the crosslinking reaction can be confirmed by the decrease of carboxylic acid groups in the polyester before the treatment.

In the presence of the polyester obtained above, a monomer that is a raw material for an acrylic resin is polymerized to synthesize an acrylic resin having a carboxylic acid group. Next, a part of the carboxylic acid group is crosslinked using the compound (crosslinking agent) having both an alkylene oxide group having a repetition number of 1 to 9 and two or more glycidyl groups to synthesize the second resin ((D) described above). Specifically, after a monomer that is a raw material for an acrylic resin is added to the liquid containing polyester and polymerized, the compound having both an alkylene oxide group having a repetition number of 1 to 9 and two or more glycidyl groups is further added and crosslinked. In this case, the crosslinked structure is mainly incorporated in the acrylic resin, but the crosslinked structure can also be incorporated in a part of the polyester resin. At the time of crosslinking, the amount of the raw material used is adjusted so that the number of moles of the glycidyl group of the crosslinking agent is smaller than the number of moles of the carboxylic acid group of the acrylic resin. The reaction temperature in the crosslinking reaction is preferably 60° C. to 100° C. The reaction time in the crosslinking reaction is preferably 1 to 5 hours. The progress of the crosslinking reaction can be confirmed by a decrease in the amount of carboxylic acid groups in the polyester and acrylic resin before the treatment.

In the presence of the polyester obtained above, a monomer that is a raw material for an acrylic resin and includes a monomer (crosslinking agent) having both an alkylene oxide group having a repetition number of 1 to 9 and two or more ethylenically unsaturated bonds is polymerized to synthesize a crosslinked acrylic resin ((E) described above). Specifically, a monomer and a crosslinking agent, which are raw materials for an acrylic resin, are added to the liquid containing polyester, and the monomer is polymerized by a known polymerization method such as an emulsion polymerization method or a soap-free polymerization method. In this case, the crosslinked structure is incorporated in the acrylic resin. The reaction temperature in the polymerization reaction is preferably 60° C. to 100° C. The reaction time in the crosslinking reaction is preferably 1 to 10 hours. As for the progress of the reaction, the decrease of the monomer is confirmed by gas chromatography or the like.

The aqueous dispersion liquid of the resin particle thus obtained is filtered with a filter (stainless steel mesh) having an appropriate pore diameter as necessary to remove coarse particles. Then, by adjusting the content of the resin particle by adding water, a liquid containing the resin particle (an aqueous dispersion liquid of the resin particle) can be prepared. The water used for adjusting the content is preferably deionized water, ion exchange water, or distilled water. From the viewpoint of ink productivity, the content (% by mass) of the resin particle in the liquid containing the resin particle is preferably 10.0% by mass or more to 50.0% by mass or less and more preferably 20.0% by mass or more to 45.0% by mass or less.

[Composition Analysis of Resin Particle]

The fact that the resins constituting the resin particle are the first resin and the second resin can be determined by, for example, the following method. First, the resin particle is added to an organic solvent (such as tetrahydrofuran) capable of dissolving a part thereof and the mixture is sufficiently stirred to prepare a sample. The resin particle used at this time may be in a state of an aqueous dispersion liquid or in a dry state. The fact that only a part of the resin particle is dissolved in the organic solvent can be confirmed by the presence of undissolved resin particle in the sample and the increase in the viscosity of the liquid component in the sample. The component dissolved in the organic solvent in the sample is the non-crosslinked first resin and the undissolved component is the crosslinked second resin. The organic solvent in which the first resin is dissolved and the undissolved component are separated and analyzed by nuclear magnetic resonance (NMR) spectroscopy, matrix-assisted laser desorption ionization mass spectrometry (MALDI-MS) or the like. Thus, the types and proportions of the units (monomers) constituting the resin can be known. Further, the resin particle can be analyzed by thermal decomposition gas chromatography to detect the units (monomers) constituting the resin.

In addition, the fact that the resin particle is formed of a plural type of resins can be indirectly confirmed by the following method. The particle size distribution of the liquid containing the resin particle (aqueous dispersion liquid) is measured using a particle size distribution measuring apparatus of a system (CHDF system) in which the particles are classified according to the size to measure the particle size distribution. For the measurement of the particle size distribution, for example, a capillary type particle size distribution measuring apparatus (trade name "CHDF-3000", manufactured by Shoko Science Co., Ltd.) can be used. Separately, the density distribution of the liquid containing the resin particle is measured by centrifugation. A case where the maximum values of the particle size distribution and the density distribution are both 1 point means that there is only one type of resin. In contrast, a case where at least one of the particle size distribution and the density distribution has a maximum value of 2 points or more means that there is a plural type of resins.

(Coloring Material)

A pigment and a dye can be used as a coloring material to be contained in the ink. It is preferable to use a pigment as the coloring material. A pigment which has particles having a particle diameter tends to easily deteriorate the abrasion resistance of a recorded image unlike a dye which is a coloring material having no particle diameter. However, by using the above-mentioned resin particle, even when the coloring material is a pigment, deterioration in abrasion resistance can be effectively suppressed. The content (% by mass) of the coloring material in the ink is preferably 0.1% by mass or more to 15.0% by mass or less and more preferably 1.0% by mass or more to 10.0% by mass or less based on the total mass of the ink.

Specific examples of the dye include compounds having a skeleton such as azo, triphenylmethane, (aza)phthalocyanine, xanthene and anthrapyridone. As the dye, it is preferable to use a compound having an anionic group.

Specific examples of the pigment include inorganic pigments such as carbon black and titanium oxide and organic pigments such as azo, phthalocyanine, quinacridone, isoindolinone, imidazolone, diketopyrrolopyrrole, dioxazine and perinone.

As a pigment dispersion method, a resin-dispersed pigment using a resin as a dispersant, a self-dispersible pigment in which a hydrophilic group is bonded to the particle surface of the pigment or the like can be used. In addition, a resin-bonded type pigment in which an organic group containing a resin is chemically bonded to the particle surface of the pigment, a microcapsule pigment in which the particle surface of the pigment is coated with a resin and the like can be used. Among these, it is preferable to use a self-dispersible pigment or a resin-dispersed pigment in which a resin as a dispersant is physically adsorbed on the particle surface of the pigment, instead of a resin-bonded type pigment or a microcapsule pigment. As the dispersant for the resin-dispersed pigment, it is more preferable to use a water-soluble resin instead of a water-insoluble resin.

Examples of the self-dispersible pigment include pigments in which an anionic group is bonded to the particle surface of the pigment directly or via another atomic group. Examples of the anionic group include a carboxylic acid group, a sulfonic acid group, a phosphoric acid group and a phosphonic acid group. Examples of the counter ion of the anionic group include cations such as hydrogen atom, alkali metal, ammonium and organic ammonium. In addition, it is preferable that the other atomic group is a group having a function of a spacer between the particle surface of the pigment and the ionic group and the molecular weight is 1,000 or less. Examples of the other atomic group include an alkylene group having about 1 to 6 carbon atoms, an arylene group such as a phenylene group and a naphthylene group, an ester group, an imino group, an amide group, a sulfonyl group and an ether group. Further, a group obtained by combining these groups may also be used.

As the resin dispersant for dispersing the pigment in the aqueous medium, it is preferable to use a resin capable of dispersing the pigment in the aqueous medium by the action of an anionic group. Examples of the resin dispersant include acrylic resins and urethane-based resins. Among these, an acrylic resin is preferable and an acrylic resin having a hydrophilic unit and a hydrophobic unit as constituent units is more preferable. Particularly, it is preferable to have a hydrophilic unit derived from (meth)acrylic acid and a hydrophobic unit derived from a monomer having an aliphatic group or an aromatic group.

The hydrophilic unit is a unit having a hydrophilic group such as an anionic group, a hydroxy group and an ethylene oxide group. The hydrophilic unit can be formed by polymerizing, for example, a monomer having a hydrophilic group. Specific examples of the monomer having a hydrophilic group include an acidic monomer having a carboxylic acid group such as (meth)acrylic acid, an anionic monomer such as an anhydride or a salt of these acidic monomers, a monomer having a hydroxy group such as 2-hydroxyethyl (meth)acrylate and a monomer having an ethylene oxide group such as methoxypolyethylene glycol (meth)acrylate. Examples of the cation constituting the salt of the acidic monomer include ions such as lithium, sodium, potassium, ammonium and organic ammonium.

The hydrophobic unit is a unit that does not have a hydrophilic group such as an anionic group, a hydroxy group, or an ethylene oxide group. The hydrophobic unit can be formed by polymerizing, for example, a hydrophobic monomer having no hydrophilic group. Specific examples of the hydrophobic monomer include monomers having an aromatic group such as styrene, α-methylstyrene and benzyl (meth)acrylate and monomers having an aliphatic group such as ethyl (meth)acrylate, methyl (meth)acrylate, (iso-) propyl (meth)acrylate, butyl (meth)acrylate and 2-ethylhexyl (meth)acrylate.

In a case where the ink contains a pigment, it is preferable that a mass ratio (times) of the content (% by mass) of the resin particle with respect to the content (% by mass) of the pigment in the ink is 0.5 times or more to 3.0 times or less. When the ratio is less than 0.5 times, the amount of the resin particle is too small with respect to the pigment and thus a higher level of abrasion resistance of an image may not be sufficiently obtained in some cases. On the other hand, when the ratio is more than 3.0 times, the number of the resin particle is too large with respect to the pigment, so that the number of the resin particle that is softer than the pigment becomes larger, an image is easily deformed by abrasion and thus, a higher level of abrasion resistance of an image may not be sufficiently obtained in some cases.

(Aqueous Medium)

The ink of the present invention is an aqueous ink containing an aqueous medium which is water or a mixed solvent of water and a water-soluble organic solvent. As the water, a deionized water (ion exchange water) is preferably used. The content (% by mass) of the water in the ink is preferably 50.0% by mass or more to 95.0% by mass or less based on the total mass of the ink. As the water-soluble organic solvent, any solvent that can be used for an ink for ink jet, such as alcohols, glycols, (poly)alkylene glycols, nitrogen-containing compounds and sulfur-containing compounds, can be used. The content (% by mass) of the water-soluble organic solvent in the ink is preferably 3.0% by mass or more to 50.0% by mass or less based on the total mass of the ink. When the content of the water-soluble organic solvent is out of the above range, the reliability of the aqueous ink for ink jet, such as sticking resistance, may be slightly lowered in some cases.

(Other Components)

The ink may also contain a water-soluble organic compound that is solid at 25° C., such as polyhydric alcohols such as trimethylolpropane and trimethylolethane and urea derivatives such as urea and ethylene urea, as necessary, in addition to the above-mentioned components. In addition, the ink may optionally contain various additives such as a surfactant, a pH adjusting agent, an antifoaming agent, a rust inhibitor, a preservative, a fungicide, an antioxidant, a reduction inhibitor and a chelating agent as necessary. In a case where a surfactant is used, the content (% by mass) of the surfactant in the ink is preferably 0.1% by mass or more to 5.0% by mass or less and more preferably 0.1% by mass or more to 2.0% by mass or less based on the total mass of the ink.

The ink may contain other resins in addition to the resin particle described above. Other resins also include dispersants for dispersing pigments. As the other resin, it is preferable to use a water-soluble resin. Examples of the form of the water-soluble resin include a block copolymer, a random copolymer, a graft copolymer and a combination thereof. Examples of the water-soluble resin include acrylic resins, urethane resins and olefin resins. Among these, acrylic resins and urethane resins are preferable.

(Physical Properties of Ink)

The viscosity of the ink at 25° C. is preferably 1.0 mPa·s or more to 10.0 mPa·s or less, more preferably 1.0 mPa·s or more to 5.0 mPa·s or less and particularly preferably 1.0 mPa·s or more to 3.0 mPa·s or less. The surface tension of the ink at 25° C. is preferably 10 mN/m or more to 60 mN/m or less, more preferably 20 mN/m or more to 60 mN/m or less and particularly preferably 30 mN/m or more to 50 mN/m or less. In addition, the pH of the ink at 25° C. is preferably 5.0 or more to 10.0 or less and more preferably 7.0 or more to 9.5 or less.

(Method for Producing Ink)

A method for producing the ink of the present invention is a method for producing an aqueous ink containing a resin particle and the method includes a step of producing a resin particle and a step of mixing the resin particle obtained in the above step and other ink components to produce an aqueous ink. The step of producing the resin particle has the following steps (1) and (2). (1) A synthetic step of reacting a polycarboxylic acid with a polyhydric alcohol to synthesize a first resin which is a polyester resin having a carboxylic acid group. (2) A crosslinking step (2-1) or (2-2) below, which is carried out in the presence of the polyester resin having a carboxylic acid group and, as necessary, a monomer as a raw material for an acrylic resin. (2-1) A crosslinking step of crosslinking a carboxylic acid group with a predetermined crosslinking agent having a glycidyl group to synthesize a second resin, thereby obtaining predetermined resin particle. (2-2) A crosslinking step of polymerizing the monomer as the raw material for the acrylic resin with a predetermined crosslinking agent having two or more ethylenically unsaturated bonds to synthesize a second resin, thereby obtaining predetermined resin particle. The predetermined resin particle is formed of the first resin and the second resin, each having a carboxylic acid group, the first resin is a polyester resin having no crosslinked structure and the second resin is at least one of a polyester resin and an acrylic resin having a crosslinked structure. The crosslinked structure of the first resin and the second resin is an alkylene oxide group having a repetition number of 1 to 9. The "other ink components" can be appropriately selected from the coloring material, the aqueous medium, other components and the like described above.

<Ink Cartridge>

An ink cartridge according to the present invention includes an ink and an ink storage portion that stores the ink. The ink contained in the ink storage is the aqueous ink of the present invention described above. FIG. 1 is a cross-sectional view schematically illustrating an exemplary embodiment of an ink cartridge of the present invention. As illustrated in FIG. 1, an ink supply port 12 for supplying an ink to a recording head is arranged on the bottom surface of the ink cartridge. The inside of the ink cartridge is an ink storage portion for storing the ink. The ink storage portion includes an ink storage chamber 14 and an absorber storage chamber 16 and the chambers communicate with each other through a communication port 18. In addition, the absorber storage chamber 16 communicates with the ink supply port 12. While a liquid ink 20 is stored in the ink storage chamber 14, absorbers 22 and 24 each holding the ink in a state of being impregnated therewith are stored in the absorber storage chamber 16. The ink storage may be of a form that is free of the ink storage chamber that stores the liquid ink and holds the total amount of the ink to be stored with the absorbers. In addition, the ink storage portion may be of a form that is free of any absorber and stores the total amount of the ink in a liquid state. Further, an ink cartridge of a form formed to have an ink storage portion and a recording head may be adopted.

<Ink Jet Recording Method>

An ink jet recording method according to the present invention is a method including ejecting the aqueous ink of the present invention described above from an ink jet recording head to record an image on a recording medium. Examples of a system of ejecting an ink include a system of applying a mechanical energy to an ink and a system of applying a thermal energy to an ink. In the present invention, it is particularly preferable to employ a system of ejecting an ink by applying a thermal energy to the ink. Steps of the ink jet recording method may be known steps except that the ink according to the present invention is used. In addition to these steps, a step of applying a reaction liquid that reacts with the ink to a recording medium in advance, a step of drying the ink, a step of heating the recording medium on which the image is recorded and the like may be performed. The ink jet recording method of the present invention preferably includes a step of recording an image on a recording medium using aqueous ink and a step of heating the recording medium. When the recording medium is heated, the resin particle attached to the recording medium is melted and thus the abrasion resistance of the image can be further improved. It is not necessary to perform a step of curing the ink or the image by irradiating the ink or the image with an active energy ray or the like.

Figure 2A:
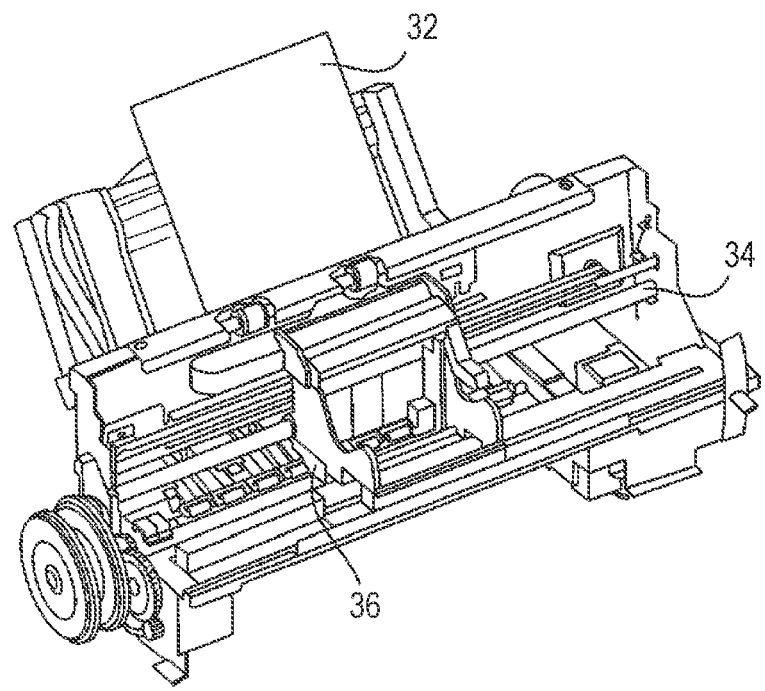
FIG. 2A is a perspective view schematically illustrating an example of a principal part of an ink jet recording apparatus used in an ink jet recording method according to the present invention.
Figure 2B:
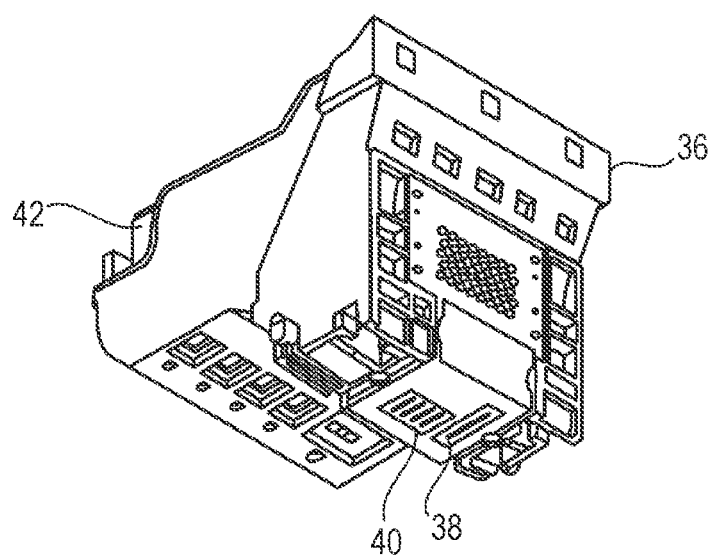
FIG. 2B is a perspective view schematically illustrating an example of a head cartridge used in the ink jet recording method according to the present invention.

FIGS. 2A and 2B are views schematically illustrating an example of an ink jet recording apparatus used in the ink jet recording method of the present invention, FIG. 2A is a perspective view of a principal part of the ink jet recording apparatus and FIG. 2B is a perspective view illustrating a head cartridge. In the ink jet recording apparatus, a conveyance unit (not shown) that conveys a recording medium 32 and a carriage shaft 34 are provided. A head cartridge 36 can be mounted on the carriage shaft 34. The head cartridge 36 includes recording heads 38 and 40 and is configured such that an ink cartridge 42 is set. The ink (not illustrated) is ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32. As the recording medium, any of a recording medium having ink absorbency such as paper and a recording medium having no ink absorbency such as a sheet or film made of resin can be used.

EXAMPLES

Hereinafter, the present invention will be described in more detail by way of Examples and Comparative Examples. However, the present invention is not intended to be limited to the following examples as long as the present invention does not depart from its gist. In the description of the amounts of components, "part(s)" and "%" are based on mass unless otherwise specified.

<Measuring Method of Physical Property Value>

(Proportion of Each Resin)

The proportion of each resin in the resin particle was measured as follows. The liquid containing the resin particle was dried to prepare solid resin particle. The solid was added to tetrahydrofuran and the mixture was stirred for 24 hours to prepare a sample. For this sample, the resin remaining undissolved was collected and the mass was measured using a 400-mesh wire mesh (a filter in which 400 stainless steel wires each were woven vertically and horizontally in a 1-inch square). The proportion of the measured mass in the solid resin particle used as the sample was calculated and used as the proportion of the second resin and a difference from 100% was used as the proportion of the first resin.

(Carboxylic Acid Group of Particle Surface of Resin Particle)

The amount of carboxylic acid groups on the particle surface of the resin particle was measured as follows. A liquid containing a resin particle was used as a sample. This sample was subjected to colloidal titration using a potential difference and the amount of carboxylic acid groups on the particle surface of the resin particle was measured. In the colloidal titration, a potential difference automatic titrator (trade name "AT510", manufactured by Kyoto Electronics Manufacturing Co., Ltd.) on which a flow potential titration unit (trade name "PCD-500", manufactured by Kyoto Electronics Manufacturing Co., Ltd.) was mounted was used. As a titration reagent, a 0.005 mol/L methyl glycol chitosan solution was used.

(Acid Value of Polyester Resin)

The acid value of the polyester resin was measured as follows. The resin particle was collected from the liquid containing the resin particle and washed with 1.0 mol/L hydrochloric acid and then water. The resin particle was added to 60 mL of a liquid in which water and tetrahydrofuran were mixed at a mass ratio of 1:6 and the resin was dissolved at 25° C. to prepare a sample. Neutralization titration was performed on this sample and the acid value of the polyester resin was measured. In the neutralization titration, a potential difference automatic titrator (trade name "AT510", manufactured by Kyoto Electronics Manufacturing Co., Ltd.) on which a composite glass electrode (trade name "C-171", manufactured by Kyoto Electronics Manufacturing Co., Ltd.) was mounted was used. As a titration reagent, a 0.5 mol/L potassium hydroxide ethanol solution was used.

(Weight Average Molecular Weight of Polyester Resin)

The weight average molecular weight of the polyester resin was measured as follows. The resin particle formed of polyester resin were added to tetrahydrofuran at 25° C. for 24 hours, the resin was dissolved in tetrahydrofuran in an environment of 25° C. for 24 hours and then filtration was performed using a membrane filter to prepare a sample. The content of the polyester resin in the sample was adjusted to be about 0.3%. For this sample, the weight average molecular weight of the polyester resin was measured by gel permeation chromatography under the following conditions.

HPLC apparatus: trade name "2695 Separations Module" (manufactured by Waters Corporation)

Differential refractive index (RI) detector: trade name "2414 detector" (manufactured by Waters Corporation)

Column: four continuous columns of trade name "GPC KF-806M" (manufactured by Showa Denko K. K.)

Eluent: tetrahydrofuran

Flow rate: 1.0 mL/min

Oven temperature: 40° C.

Sample injection amount: 100 μL

A molecular weight calibration curve created using standard polystyrene resins (trade name "TSK STANDARD POLYSTYRENE" F-850, F-450, F-288, F-128, F-80, F-40, F-20, F-10, F-4, F-2, F-1, A-5000, A-2500, A-1000 and A-500, manufactured by Tosoh Corporation) was used to calculate the weight average molecular weight. (Determination of Whether or Not Resin Is Resin Particle and Particle Diameter)

The determination of whether or not the resin is the resin particle and the measurement of the particle diameter ($D_{50}$ and $D_{90}$) of the resin particle was performed as follows. The liquid containing the resin was diluted with pure water to prepare a sample having a resin content of about 1.0%. The particle diameter of this sample was measured using a particle size distribution meter (trade name "NANOTRACK WAVEII-Q", manufactured by Microtrac Bell Co., Ltd.) by a dynamic light scattering method. The measurement is performed under the conditions of a SetZero of 30 seconds, a number of measurements of 3 times, a measurement time of 180 seconds, a shape of real spherical shape, a refractive index of 1.6 and a density of 1.0. In the above method, when the particle having a particle diameter was measured, the resin was determined to be the "resin particle (that is, "water-dispersible resin")" and when the particle having a particle diameter was not measured, the resin was determined not to be the "resin particle (that is, "water-soluble resin").

(Proportion of Compound Represented by Formula (1) in Resin Particle)

The proportion of the compound represented by Formula (1) in the resin particle was measured as follows. The liquid containing the resin particle was dried at 60° C. to prepare solid resin particle and the mass was measured. The solid was added to tetrahydrofuran and the mixture was stirred for 24 hours to prepare a sample. For this sample, the resin remaining undissolved was collected and the mass was measured using a 400-mesh wire mesh (a filter in which 400 stainless steel wires each were woven vertically and horizontally in a 1-inch square). On the other hand, for the filtrate, the area of the peaks derived from the compound represented by Formula (1) and the first resin were obtained using a differential refractive index (RI) detector in the same manner as the measuring method for the weight average molecular weight described above. The proportion was calculated from the obtained area and the mass of the resin particle, the first resin and the second resin.

(Viscosity of Ink)

The viscosity of the ink was measured using an E-type viscometer (trade name "RE80-L", manufactured by Told Sangyo) that circulates an antifreeze solution in a constant temperature tank set at 25° C. through a tube with a rotor (1°34'×R24) attached.

<Synthesis of Polyester Resin>

A mixture of the components (units: parts) shown in the item of "Esterification reaction" in Table 1 was placed in a reaction vessel, then the reaction vessel was installed in an autoclave and heated at 220° C. for 4 hours to carry out an esterification reaction. In Table 1, the abbreviations of the components each represent EG: ethylene glycol, NPG: neopentyl glycol, BPA: bisphenol A, GLY: glycerin, tPA: terephthalic acid, iPA: isophthalic acid, BTA: trimellitic acid and HAD: adipic acid. Then, the temperature was raised to 240° C. and the pressure in the autoclave was reduced to 13 Pa over 90 minutes. After continuing the esterification (dehydration condensation) reaction while maintaining a reduced pressure of 13 Pa at 240° C. for 5 hours, nitrogen gas was introduced into the autoclave to return to normal pressure. The temperature inside the reaction vessel was lowered to 220° C., the catalyst (tetra-n-butyl titanate) and the components (unit: part) shown in the item "Transesterification reaction" in Table 1 were added and the mixture was heated at 220° C. for 2 hours to carry out a transesterification reaction. Then, nitrogen gas was introduced into the autoclave to make a pressurized state and the sheet-shaped resin was taken out. This resin was cooled to 25° C. and then crushed with a crusher to obtain a polyester resin. The acid value and the weight average molecular weight of the polyester resin are shown on the right side of Table 1.

TABLE 1

Synthetic conditions and characteristics of polyester resin

| | | Synthetic conditions | | | | | | | | | | | Characteristics | |
| --- | --- | --- | --- | --- | --- | --- | --- | --- | --- | --- | --- | --- | --- | --- |
| | | Esterification reaction | | | | | | | Transesterification reaction | | | Total amount used | | Acid value (mgKOH/g) | Weight average molecular weight |
| | | EG | NPG | BPA | GLY | tPA | iPA | BTA | HAD | BTA | HAD | GLY | Polyhydric alcohol | Polycarboxylic acid | | |
| Poly-ester resin | 1 | 90.0 | | 10.0 | | 50.0 | 50.0 | 7.6 | | 2.4 | | | 100.0 | 110.0 | 7 | 35,000 |
| | 2 | | 90.0 | 10.0 | | 50.0 | 50.0 | 7.6 | | 2.4 | | | 100.0 | 110.0 | 7 | 35,000 |
| | 3 | 90.0 | | | 10.0 | 50.0 | 50.0 | 7.6 | | 2.4 | | | 100.0 | 110.0 | 7 | 35,000 |
| | 4 | 90.0 | | | 10.0 | 50.0 | 50.0 | 7.6 | | | 2.4 | | 100.0 | 110.0 | 7 | 35,000 |
| | 5 | 90.0 | | | 10.0 | 50.0 | 50.0 | | 7.6 | | 2.4 | | 100.0 | 110.0 | 7 | 35,000 |
| | 6 | 90.0 | | 10.0 | 10.0 | 50.0 | 50.0 | | | | | 10.0 | 120.0 | 100.0 | 0 | 35,000 |

<Manufacturing of Resin Particle Formed of Polyester Resin>

A stirrer (trade name "TORNADO STIRRER STANDARD SM-104", manufactured by AS ONE) was set in a beaker having a volume of 2 L. In this beaker, 210 g of the polyester resin of the type shown in Table 2, the organic solvent (unit: g) and the compound represented by Formula (1) (indicated as "Formula (1)" in Table 2, unit: mg) were placed and the materials were stirred at 25° C. to dissolve the polyester resin. As the compound represented by Formula (1), 2,6-di-t-butyl-p-cresol was used. In Table 2, the abbreviations for organic solvents each represent THF: tetrahydrofuran, MEK: methyl ethyl ketone and IPA: isopropanol. Next, a 5% aqueous sodium hydroxide solution in an amount used corresponding to the neutralization rate (% by mole) based on the acid value of the polyester resin was added, and the mixture was stirred for 30 minutes. Further, 900 g of deionized water was added dropwise to the beaker at a rate of 20 mL/min while stirring at 10° C. and 150 rpm. Then, the temperature was raised to 60° C., the organic solvent was distilled off under reduced pressure, and a part of water was also distilled off. The beaker was placed in a water bath, the resultant was continuously stirred at 85° C. at the stirring rate for heat treatment time shown in Table 2 and a heat treatment was performed. Then, the content of the beaker was filtered using a 150-mesh wire mesh (a filter in which 150 stainless steel wires each were woven vertically and horizontally in 1-inch square). Next, an appropriate amount of deionized water was added to adjust the content of the resin particle and a liquid containing the resin particle formed of each polyester resin in which the content of the resin particle formed of the polyester resin was 25.0% was obtained. However, with the resin particle 20 formed of the polyester resin produced using the polyester resin having no carboxylic acid group, a liquid containing the resin particle formed of the polyester resin in a uniform state could not be obtained due to the formation of aggregates in the production process. Table 2 shows the volume-based cumulative 50% particle diameter $D_{50}$ of the resin particle.

materials were stirred at 80° C. for 5 hours. After adjusting the pH to 8.5, pressure filtration was performed with a microfilter (manufactured by Fujifilm Corporation) having a pore diameter of 3.0 μm. Next, an appropriate amount of deionized water was added to adjust the content of the resin particle and a liquid containing each resin particle having a resin particle content of 25.0% was obtained. The resin particles 1 to 8 were resin particles formed of the first resin which was a non-crosslinked polyester resin and the second resin which was a crosslinked polyester resin. Further, the liquid containing the resin particle in a uniform state could not be obtained with the resin particle 44 prepared by using the liquid containing the resin particle 20 formed of the polyester resin.

Products of "Crosslinking agent having alkylene oxide group" in Table 3 include the following trade names manufactured by Nagase ChemteX Corporation.

EX-810: trade name "DENACOL EX-810", ethylene glycol diglycidyl ether, number of repetitions of ethylene oxide group: 1

EX-830: trade name "DENACOL EX-830", polyethylene glycol diglycidyl ether, number of repetitions of ethylene oxide group: 9

EX-920: trade name "DENACOL EX-920", polypropine glycol diglycidyl ether, number of repetitions of propylene oxide group: 3

EX-841: trade name "DENACOL EX-841", polyethylene glycol diglycidyl ether, number of repetitions of ethylene oxide group: 13

TABLE 2

Production conditions and characteristics of resin particle formed of polyester resin

| | | | Production conditions | | | | | | Characteristics |
|---|---|---|---|---|---|---|---|---|---|
| | | | Organic solvent | | | Formula (1) | Conditions | | |
| | | Type of polyester resin | THF (g) | MEK (g) | IPA (g) | BHT (mg) | Neutralization rate (% by mole) | Stirring rate (rpm) | Heat treatment (hour) | $D_{50}$ (nm) |
| Resin particle formed of polyester resin | 1 | 1 | 390 | | | 100 | 80 | 150 | 1 | 120 |
| | 2 | 2 | 390 | | | 100 | 80 | 150 | 1 | 120 |
| | 3 | 3 | 390 | | | 100 | 80 | 150 | 1 | 120 |
| | 4 | 4 | 390 | | | 100 | 80 | 150 | 1 | 120 |
| | 5 | 1 | 195 | 195 | | 100 | 80 | 150 | 1 | 120 |
| | 6 | 1 | | 195 | 195 | 100 | 80 | 150 | 1 | 120 |
| | 7 | 5 | 390 | | | 100 | 80 | 150 | 1 | 120 |
| | 8 | 1 | 390 | | | | 80 | 150 | 1 | 120 |
| | 9 | 1 | 390 | | | 30 | 80 | 150 | 1 | 120 |
| | 10 | 1 | 390 | | | 50 | 80 | 150 | 1 | 120 |
| | 11 | 1 | 390 | | | 440 | 80 | 150 | 1 | 120 |
| | 12 | 1 | 390 | | | 500 | 80 | 150 | 1 | 120 |
| | 13 | 1 | 490 | | | 100 | 90 | 500 | 1 | 37 |
| | 14 | 1 | 490 | | | 100 | 90 | 450 | 1 | 40 |
| | 15 | 1 | 390 | | | 100 | 80 | 100 | 1 | 160 |
| | 16 | 1 | 210 | | | 100 | 80 | 100 | 1 | 200 |
| | 17 | 1 | 630 | | | 100 | 80 | 150 | 0 | 120 |
| | 18 | 1 | 630 | | | 100 | 80 | 150 | 1 | 120 |
| | 19 | 1 | 140 | | | 100 | 80 | 450 | 1 | 120 |
| | 20 | 6 | 390 | | | 100 | 80 | 150 | 1 | — |

<Production of Resin Particle Formed of First Resin and Second Resin>
(Resin Particles 1 to 8, 39, 40 and 44)

A stirrer (trade name "TORNADO STIRRER STANDARD SM-104", manufactured by AS ONE) was set in a beaker having a volume of 300 mL. In this beaker, 100 g of the liquid (resin particle content: 25.0%) containing the resin particle formed of the polyester resin of the type shown in Table 3 and the crosslinking agent having the alkylene oxide group of the type shown in Table 3 were poured and the Table 3 shows the volume-based cumulative 50% particle diameter $D_{50}$, the volume-based cumulative 90% particle diameters $D_{90}$, the ratio $D_{50}/D_{90}$ of the resin particle. In addition, the amount of carboxylic acid groups present on the particle surface (denoted as "Carboxylic acid group of particle surface" in Table 3) is shown. Further, the ratio of the compound represented by Formula (1) in the resin particle (denoted as "Proportion of Formula (1) in resin particle" in Table 3) and the proportion of the second resin are shown.

TABLE 3

Production conditions and characteristics of resin particles 1 to 8, 39, 40, and 44

| | | Production conditions | | | | Characteristics | | | | | |
|---|---|---|---|---|---|---|---|---|---|---|---|
| | | | Crosslinking agent having alkylene oxide group | | | | | | | Carboxylic acid group of particle surface (μmol/g) | Proportion of Formula (1) in resin particle (ppm) | Proportion of second resin in resin particle (%) |
| | Type of resin particle formed of polyester resin | EX-810 (mg) | EX-830 (mg) | EX-920 (mg) | EX-841 (mg) | $D_{50}$ (nm) | $D_{90}$ (nm) | $D_{50}/D_{90}$ (times) | | | |
| Resin particle | 1 | 1 | 363 | | | | 122 | 175 | 0.7 | 32 | 450 | 50 |
| | 2 | 1 | | 860 | | | 122 | 175 | 0.7 | 32 | 450 | 50 |
| | 3 | 1 | | | 565 | | 122 | 175 | 0.7 | 32 | 450 | 50 |
| | 4 | 2 | 363 | | | | 122 | 175 | 0.7 | 32 | 450 | 50 |
| | 5 | 3 | 368 | | | | 122 | 175 | 0.7 | 33 | 450 | 50 |
| | 6 | 4 | 363 | | | | 122 | 175 | 0.7 | 33 | 450 | 50 |
| | 7 | 5 | 363 | | | | 122 | 175 | 0.7 | 32 | 450 | 50 |
| | 8 | 6 | 363 | | | | 122 | 175 | 0.7 | 32 | 450 | 50 |
| | 39 | 1 | | | | | 120 | 170 | 0.7 | — | 450 | 0 |
| | 40 | 1 | | | | 1194 | 122 | 175 | 0.7 | — | 450 | 50 |
| | 44 | 20 | | | | | — | — | — | — | 450 | — |

(Resin Particles 9 to 38 and 41 to 43)

In a flask equipped with a stirrer, a nitrogen introduction tube, a reflux condenser and a thermometer, 100 g of the liquid (resin particle content: 25.0%) containing the resin particle formed of the polyester resins shown in Table 4 was placed and the temperature was raised to 80° C. Separately, a mixture of 25 g of ion exchange water, the monomer having an alkylene oxide group and a monomer as a raw material for an acrylic resin of the types in the amounts used (g) shown in Table 4, and the surfactant (sodium dodecylbenzenesulfonate) in the amount used (g) shown in Table 4 was prepared. This mixture was mixed using a homogenizer (trade name "T50D ULTRA-TURRAX", manufactured by IKA) to obtain a monomer mixture. The obtained monomer mixture and 10 g of a 3% aqueous potassium persulfate solution were added dropwise to the above flask over 2 hours, and the mixture was stirred at 80° C. for 2 hours. After adjusting the pH to 8.5, pressure filtration was performed with a microfilter (manufactured by Fujifilm Corporation) having a pore diameter of 3.0 μm. Next, an appropriate amount of deionized water was added to adjust the content of the resin particle and a liquid containing each resin particle having a resin particle content of 25.0% was obtained. The resin particles 9 to 38, 41 and 43 were resin particles formed of the first resin which was a non-crosslinked polyester resin and the second resin which was a crosslinked acrylic resin. The resin particle 42 was a resin particle formed of the first resin which was a non-crosslinked polyester resin and the second resin which was a non-crosslinked acrylic resin.

The abbreviations in Table 4 are as follows.

EGDMA: ethylene glycol dimethacrylate, ethylene oxide group repetition number: 1

PDE-200: trade name "BLEMMER PDE-200", manufactured by NOF Corporation, polyethylene glycol dimethacrylate, number of repetitions of ethylene oxide group: 4

PDP-400N: trade name "BLEMMER PDP-400N", manufactured by NOF Corporation, polypropylene glycol dimethacrylate, number of repetitions of ethylene oxide group: 7

PDT-650: trade name "BLEMMER PDT-650", manufactured by NOF Corporation, polytetramethylene glycol dimethacrylate, number of repetitions of butylene oxide group: 9

PDE-600: trade name "BLEMMER PDE-600", manufactured by NOF Corporation, polyethylene glycol dimethacrylate, number of repetitions of ethylene oxide group: 14

MAA: methacrylic acid

St: styrene

EMA: ethyl methacrylate

Similar to Table 3, Table 4 shows the volume-based cumulative 50% particle diameter $D_{50}$, the volume-based cumulative 90% particle diameters $D_{90}$, the ratio $D_{50}/D_{90}$ of the resin particle. In addition, the amount of carboxylic acid groups present on the particle surface (denoted as "Carboxylic acid group of particle surface" in Table 4) is shown. Further, the ratio of the compound represented by Formula (1) in the resin particle (denoted as "Proportion of Formula (1) in resin particle" in Table 4) and the proportion of the second resin are shown.

TABLE 4

Production conditions and characteristics of resin particles 9 to 38 and 41 to 43

| | | Production conditions | | | | | | | | | | Characteristics | | | | | |
|---|---|---|---|---|---|---|---|---|---|---|---|---|---|---|---|---|---|
| | | Resin particle formed of polyester resin | | Monomer having alkylene oxide group | | | | | Monomer as raw material for acrylic resin | | | Surfactant | | | | Carboxylic acid group of particle surface (μmol/g) | Proportion of Formula (1) in resin particle (ppm) | Proportion of second resin in resin particle (%) |
| | | Type | Amount of liquid used (g) | EGDMA (g) | PDE-200 (g) | PDP-400N (g) | PDT-650 (g) | PDE-600 (g) | MAA (g) | St (g) | EMA (g) | (g) | $D_{50}$ (nm) | $D_{90}$ (nm) | $D_{50}/D_{90}$ (times) | | | |
| Resin particle | 9 | 1 | 100 | | 2.0 | | | | 2.0 | 21.0 | | 1.0 | 150 | 210 | 0.7 | 116 | 225 | 50 |
| | 10 | 1 | 100 | 2.0 | | | | | 2.0 | 21.0 | | 1.0 | 150 | 210 | 0.7 | 116 | 225 | 50 |

TABLE 4-continued

Production conditions and characteristics of resin particles 9 to 38 and 41 to 43

| | Production conditions | | | | | | | | | | Characteristics | | | | | |
|---|---|---|---|---|---|---|---|---|---|---|---|---|---|---|---|---|
| | Resin particle formed of polyester resin | | Monomer having alkylene oxide group | | | | | Monomer as raw material for acrylic rein | | | Surfactant | | | | Carboxylic acid group of particle surface | Proportion of Formula (1) in resin particle | Proportion of second resin in resin particle |
| Type | Amount of liquid used (g) | EGDMA (g) | PDE-200 (g) | PDP-400N (g) | PDT-650 (g) | PDE-600 (g) | MAA (g) | St (g) | EMA (g) | tant (g) | $D_{50}$ (nm) | $D_{90}$ (nm) | $D_{90}/D_{50}$ (times) | ($\mu$mol/g) | (ppm) | (%) |
| 11 | 1 | 100 | | 2.0 | | | 2.0 | 21.0 | | 1.0 | 150 | 210 | 0.7 | 116 | 225 | 50 |
| 12 | 1 | 100 | | | 2.0 | | 2.0 | 21.0 | | 1.0 | 150 | 210 | 0.7 | 116 | 225 | 50 |
| 13 | 1 | 100 | 2.0 | | | | 2.0 | | 21.0 | 1.0 | 150 | 210 | 0.7 | 116 | 225 | 50 |
| 14 | 2 | 100 | 2.0 | | | | 2.0 | 21.0 | | 1.0 | 150 | 210 | 0.7 | 116 | 225 | 50 |
| 15 | 3 | 100 | 2.0 | | | | 2.0 | 21.0 | | 1.0 | 150 | 210 | 0.7 | 116 | 225 | 50 |
| 16 | 7 | 100 | 2.0 | | | | 2.0 | 21.0 | | 1.0 | 150 | 210 | 0.7 | 116 | 225 | 50 |
| 17 | 5 | 100 | 2.0 | | | | 2.0 | 21.0 | | 1.0 | 150 | 210 | 0.7 | 116 | 225 | 50 |
| 18 | 6 | 100 | 2.0 | | | | 2.0 | 21.0 | | 1.0 | 150 | 210 | 0.7 | 116 | 225 | 50 |
| 19 | 1 | 100 | 2.0 | | | | 0.4 | 22.6 | | 1.0 | 150 | 210 | 0.7 | 20 | 225 | 50 |
| 20 | 1 | 100 | 2.0 | | | | 0.5 | 22.5 | | 1.0 | 150 | 210 | 0.7 | 25 | 225 | 50 |
| 21 | 1 | 100 | 2.0 | | | | 4.0 | 19.0 | | 1.0 | 150 | 210 | 0.7 | 250 | 225 | 50 |
| 22 | 1 | 100 | 2.0 | | | | 4.5 | 18.5 | | 1.0 | 150 | 210 | 0.7 | 260 | 225 | 50 |
| 23 | 1 | 150 | 1.0 | | | | 1.0 | 10.5 | | 0.5 | 150 | 210 | 0.7 | 58 | 113 | 25 |
| 24 | 1 | 140 | 1.2 | | | | 1.2 | 12.6 | | 0.6 | 150 | 210 | 0.7 | 70 | 135 | 30 |
| 25 | 1 | 40 | 3.2 | | | | 3.2 | 33.6 | | 1.6 | 150 | 210 | 0.7 | 186 | 360 | 80 |
| 26 | 1 | 30 | 3.4 | | | | 3.4 | 35.7 | | 1.7 | 150 | 210 | 0.7 | 198 | 383 | 85 |
| 27 | 8 | 100 | 2.0 | | | | 2.0 | 21.0 | | 1.0 | 150 | 210 | 0.7 | 116 | 0 | 50 |
| 28 | 9 | 100 | 2.0 | | | | 2.0 | 21.0 | | 1.0 | 150 | 210 | 0.7 | 116 | 70 | 50 |
| 29 | 10 | 100 | 2.0 | | | | 2.0 | 21.0 | | 1.0 | 150 | 210 | 0.7 | 116 | 100 | 50 |
| 30 | 11 | 100 | 2.0 | | | | 2.0 | 21.0 | | 1.0 | 150 | 210 | 0.7 | 116 | 1000 | 50 |
| 31 | 12 | 100 | 2.0 | | | | 2.0 | 21.0 | | 1.0 | 150 | 210 | 0.7 | 116 | 1150 | 50 |
| 32 | 13 | 100 | 2.0 | | | | 2.0 | 21.0 | | 1.0 | 45 | 69 | 0.7 | 116 | 225 | 50 |
| 33 | 14 | 100 | 2.0 | | | | 2.0 | 21.0 | | 1.0 | 50 | 76 | 0.7 | 116 | 225 | 50 |
| 34 | 15 | 100 | 2.0 | | | | 2.0 | 21.0 | | 1.0 | 200 | 270 | 0.7 | 116 | 225 | 50 |
| 35 | 16 | 100 | 2.0 | | | | 2.0 | 21.0 | | 1.0 | 250 | 380 | 0.7 | 116 | 225 | 50 |
| 36 | 17 | 100 | 2.0 | | | | 2.0 | 21.0 | | 1.0 | 150 | 280 | 0.5 | 116 | 225 | 50 |
| 37 | 18 | 100 | 2.0 | | | | 2.0 | 21.0 | | 1.0 | 150 | 250 | 0.6 | 116 | 225 | 50 |
| 38 | 19 | 100 | 2.0 | | | | 2.0 | 21.0 | | 1.0 | 150 | 188 | 0.8 | 116 | 225 | 50 |
| 41 | 1 | 100 | 2.0 | | | | | 23.0 | | 1.0 | 150 | 210 | 0.7 | 0 | 225 | 50 |
| 42 | 1 | 100 | | | | | 2.0 | 23.0 | | 1.0 | 150 | 210 | 0.7 | 116 | 225 | 50 |
| 43 | 1 | 100 | | | | 2.0 | 2.0 | 21.0 | | 1.0 | 150 | 210 | 0.7 | 116 | 225 | 50 |

(Resin Particle 45)

In a four-necked flask equipped with a stirrer, a reflux condenser and a nitrogen gas introduction tube, 0.2 parts of potassium persulfate and 79.4 parts of ion exchange water were placed and nitrogen gas was introduced. In addition, 19.7 parts of butyl methacrylate, 0.4 parts of methacrylic acid and 0.3 parts of a reactive surfactant (trade name "AQUALON KH-05", manufactured by Dai-ichi Kogyo Seiyaku Co., Ltd.) were mixed to obtain a mixture. The obtained mixture was added dropwise to the four-necked flask for 1 hour with stirring and then reacted at 80° C. for 2 hours. The content was then cooled to 25° C. and potassium hydroxide and an appropriate amount of ion exchange water were added to adjust the pH of the liquid to 8.5. In this manner, a liquid containing the resin particle 45 having a resin particle content of 25.0% was obtained. The resin particle 45 was formed of an acrylic resin having no crosslinked structure.

(Resin Particle 46)

In a four-necked flask equipped with a stirrer, a reflux condenser and a nitrogen gas introduction tube, 0.20 parts of potassium persulfate and 79.59 parts of ion exchange water were placed and nitrogen gas was introduced. In addition, 16.70 parts of butyl methacrylate, 0.21 parts of methacrylic acid, 3.00 parts of ethylene glycol dimethacrylate, 0.30 parts of reactive surfactant (trade name "AQUALON KH-05", first (Manufactured by Industrial Pharmaceutical Co., Ltd.) was mixed to obtain a mixture. The obtained mixture was added dropwise to the four-necked flask for 1 hour with stirring and then reacted at 80° C. for 2 hours. The content was then cooled to 25° C. and potassium hydroxide and an appropriate amount of ion exchange water were added to adjust the pH of the liquid to 8.5. In this manner, a liquid containing the resin particle 46 having a resin particle content of 25.0% was obtained. The resin particle 46 was formed of an acrylic resin having a crosslinked structure.

(Resin Particle 47)

Resin particle formed of the polyester resins B-a6 and B-a1 were produced according to the description of the production method of "Composite self-dispersible polyester aqueous dispersion PL-10" in Japanese Patent Application Laid-Open No. 2011-084673. The concentration was adjusted by a normal method to obtain a liquid containing the resin particle 47 having a resin particle content of 25.0%. The resin particle 47 was formed of a resin having no crosslinked structure.

(Resin Particle 48)

Resin particle formed of a polyester resin Em1-1 and an acrylic resin graft polymer were produced according to the description of "Graft polymer G4 (Production Example 24)" of Japanese Patent Application Laid-Open No. 2014-125555. The concentration was adjusted by a conventional method to obtain a liquid containing resin particle 48 having a resin particle content of 25.0%. The resin particle 48 was formed of a resin having no crosslinked structure.

<Preparation of Pigment Dispersion Liquid>

(Pigment Dispersion Liquid 1)

A mixture of 10.0 parts of a pigment, 20.0 parts of a liquid containing a resin and 70.0 parts of ion exchange water was placed in a batch-type vertical sand mill (manufactured by IMEX Co., Ltd.) filled with 200 parts of zirconia beads having a diameter of 0.3 mm and dispersed for 5 hours. As the pigment, C.I. Pigment Yellow 74 (trade name "Hansa yellow 5GX 01 LV 3344", manufactured by Clariant Co.) was used. As the liquid containing the resin, an aqueous solution in which the water-soluble resin was dissolved in water containing potassium hydroxide whose amount is equimolar to the acid value of the water-soluble resin and the resin content was 30.0% was used. The water-soluble resin used at this case was an ethyl styrene-ethyl acrylate-acrylic acid copolymer having an acid value of 167 mgKOH/g and a weight average molecular weight of 10,000. Then, the resultant was centrifuged to remove coarse particles and pressure-filtered with a microfilter (manufactured by Fujifilm Corporation) having a pore diameter of 3.0 μm to obtain a pigment dispersion liquid 1. The pigment content in the pigment dispersion liquid 1 was 10.0% and the resin content was 6.0%.

(Pigment Dispersion Liquid 2)

5.0 g of concentrated hydrochloric acid was dissolved in 5.5 g of water, the solution was cooled to 5° C. and 1.6 g of 4-aminophthalic acid was added in this state. The container containing this solution was placed in an ice bath and the solution was maintained at a temperature of 10° C. or lower by being stirred. To this solution, a solution obtained by dissolving 1.8 g of sodium nitrite in 9.0 g of ion exchange water of 5° C. was added. The resulting solution was stirred for 15 minutes and 6.0 g of carbon black (trade name "NIPex 170IQ") was then added thereto with stirring, followed by further stirring for 15 minutes to obtain a slurry. The obtained slurry was filtered through a filter paper (trade name "STANDARD FILTER PAPER No. 2", manufactured by ADVANTECH) and the particles were thoroughly washed with water and dried in an oven at 110° C. Then, the counter ion was exchanged from a sodium ion to a potassium ion by an ion exchange method to obtain a self-dispersible pigment having a —$C_6H_3$—$(COOK)_2$ group bonded to the surface of the carbon black particles. The content of the pigment was adjusted by adding an appropriate amount of ion exchange water and thus a pigment dispersion liquid 2 having a pigment content of 10.0% was obtained.

<Preparation of Ink>

Each component shown below was mixed, sufficiently stirred and then pressure-filtered with a microfilter having a pore diameter of 2.5 μm to prepare an ink. Acetyleneol E100 is a trade name of a nonionic surfactant manufactured by Kawaken Fine Chemicals Co., Ltd. Table 5 also shows the characteristics of the ink.

Coloring material (type shown in Table 5): used amount (%) shown in Table 5

Liquid containing the resin particle (type shown in Table 5): 24.0%

Glycerin: 5.0%

Triethylene glycol: 10.0%

Acetyleneol E100: 0.1%

Ion exchange water: remainder (%) that makes the total of the components 100.0%

<Evaluation>

In the present invention, in the evaluation criteria of the following respective evaluation items, "A" and "B" were taken as acceptable levels and "C" was taken as an unacceptable level. The evaluation results are shown in Table 5.

Each of the inks obtained above was filled in an ink cartridge and the ink cartridge was mounted on an ink jet recording apparatus (trade name "PIXUS iP3100", manufactured by Canon Inc.) that ejects the ink from a recording head by the action of thermal energy. In the examples, the recording duty of the solid image recorded under the condition that 5 pL of one ink droplet is applied to a unit area of $\frac{1}{1200}$ inch×$\frac{1}{1200}$ inch is defined as 100%.

(Abrasion Resistance)

Using the above-mentioned ink jet recording apparatus, a solid image of 200 mm×200 mm having a recording duty of 100% was recorded on a recording medium (trade name "AURORA COAT", manufactured by Nippon Paper Industries Co., Ltd.). The image was dried at 25° C. for 24 hours. The obtained image was subjected to an abrasion test under the condition of 10 reciprocations with a load of 500 g using a Gakushin type tester (trade name "ABRASION RESISTANCE TESTER", manufactured by Imoto Machinery Co., Ltd.) that can perform measurement according to JIS L 0849. The image after the abrasion test was visually confirmed and the abrasion resistance was evaluated according to the following evaluation criteria.

A: There were no scratches on the image.

B: The image had scratches, but the recording medium was not visible.

C: The image had scratches and the recording medium was visible.

(Ejection Stability)

In the following evaluation, the temperature of the ink in the ejection orifice of the recording head was maintained at 50° C. using a ceramic heater attached to the ink cartridge. Using the above-mentioned ink jet recording apparatus, 50 solid images of 19 cm×26 cm having a recording duty of 100% were recorded on a recording medium (trade name "GF-500", manufactured by Canon Inc.). The first, tenth and fiftieth solid images were visually confirmed and the ejection stability was evaluated according to the following evaluation criteria.

A: No white streaks or blurs occurred on the fiftieth image.

B: No white streaks and blurs occurred on the tenth sheet, but white streaks and blurs occurred on the fiftieth sheet.

C: No white streaks or blurs occurred on the first sheet, but white streaks or blurs occurred on the tenth sheet.

TABLE 5

Composition and characteristics of ink and evaluation results

| | | Composition | | | Characteristics | | | | | |
|---|---|---|---|---|---|---|---|---|---|---|
| | | Coloring material | | Type of resin particle | Content | | | | Evaluation results | |
| | | Type | Amount used (%) | | Pigment P (%) | Resin particle R (%) | R/P value (times) | Viscosity (mPa·s) | Abrasion resistance | Ejection stability |
| Example | 1 | Pigment dispersion liquid 1 | 30.0 | 1 | 3.0 | 6.0 | 2.0 | 2.1 | A | B |
| | 2 | Pigment dispersion liquid 2 | 30.0 | 1 | 3.0 | 6.0 | 2.0 | 2.1 | A | B |
| | 3 | Pigment dispersion liquid 1 | 30.0 | 2 | 3.0 | 6.0 | 2.0 | 2.1 | A | B |
| | 4 | Pigment dispersion liquid 1 | 30.0 | 3 | 3.0 | 6.0 | 2.0 | 2.1 | A | B |
| | 5 | Pigment dispersion liquid 1 | 30.0 | 4 | 3.0 | 6.0 | 2.0 | 2.1 | A | B |
| | 6 | Pigment dispersion liquid 1 | 30.0 | 5 | 3.0 | 6.0 | 2.0 | 2.1 | A | B |
| | 7 | Pigment dispersion liquid 1 | 30.0 | 6 | 3.0 | 6.0 | 2.0 | 2.1 | A | B |
| | 8 | Pigment dispersion liquid 1 | 30.0 | 7 | 3.0 | 6.0 | 2.0 | 2.1 | A | B |
| | 9 | Pigment dispersion liquid 1 | 30.0 | 8 | 3.0 | 6.0 | 2.0 | 2.1 | A | B |
| | 10 | — | — | 1 | 0.0 | 6.0 | — | 2.1 | B | B |
| | 11 | C.I. Direct Blue 199 | 3.0 | 1 | 0.0 | 6.0 | — | 2.1 | B | B |
| | 12 | Pigment dispersion liquid 1 | 30.0 | 9 | 3.0 | 6.0 | 2.0 | 2.1 | A | A |
| | 13 | Pigment dispersion liquid 1 | 30.0 | 9 | 3.0 | 6.0 | 2.0 | 2.1 | A | A |
| | 14 | Pigment dispersion liquid 1 | 30.0 | 10 | 3.0 | 6.0 | 2.0 | 2.1 | A | A |
| | 15 | Pigment dispersion liquid 1 | 30.0 | 11 | 3.0 | 6.0 | 2.0 | 2.1 | A | A |
| | 16 | Pigment dispersion liquid 1 | 30.0 | 12 | 3.0 | 6.0 | 2.0 | 2.1 | A | A |
| | 17 | Pigment dispersion liquid 1 | 30.0 | 13 | 3.0 | 6.0 | 2.0 | 2.1 | A | A |
| | 18 | Pigment dispersion liquid 1 | 30.0 | 14 | 3.0 | 6.0 | 2.0 | 2.1 | A | A |
| | 19 | Pigment dispersion liquid 1 | 30.0 | 15 | 3.0 | 6.0 | 2.0 | 2.1 | A | A |
| | 20 | Pigment dispersion liquid 1 | 30.0 | 16 | 3.0 | 6.0 | 2.0 | 2.1 | A | A |
| | 21 | Pigment dispersion liquid 1 | 30.0 | 17 | 3.0 | 6.0 | 2.0 | 2.1 | A | A |
| | 22 | Pigment dispersion liquid 1 | 30.0 | 18 | 3.0 | 6.0 | 2.0 | 2.1 | A | A |
| | 23 | Pigment dispersion liquid 1 | 30.0 | 19 | 3.0 | 6.0 | 2.0 | 2.1 | A | B |
| | 24 | Pigment dispersion liquid 1 | 30.0 | 20 | 3.0 | 6.0 | 2.0 | 2.1 | A | A |
| | 25 | Pigment dispersion liquid 1 | 30.0 | 21 | 3.0 | 6.0 | 2.0 | 2.1 | A | A |
| | 26 | Pigment dispersion liquid 1 | 30.0 | 22 | 3.0 | 6.0 | 2.0 | 2.4 | A | B |
| | 27 | Pigment dispersion liquid 1 | 30.0 | 23 | 3.0 | 6.0 | 2.0 | 2.1 | A | B |
| | 28 | Pigment dispersion liquid 1 | 30.0 | 24 | 3.0 | 6.0 | 2.0 | 2.1 | A | A |
| | 29 | Pigment dispersion liquid 1 | 30.0 | 25 | 3.0 | 6.0 | 2.0 | 2.1 | A | A |
| | 30 | Pigment dispersion liquid 1 | 30.0 | 26 | 3.0 | 6.0 | 2.0 | 2.1 | B | A |
| | 31 | Pigment dispersion liquid 1 | 30.0 | 27 | 3.0 | 6.0 | 2.0 | 2.4 | B | B |
| | 32 | Pigment dispersion liquid 1 | 30.0 | 28 | 3.0 | 6.0 | 2.0 | 2.1 | A | B |
| | 33 | Pigment dispersion liquid 1 | 30.0 | 29 | 3.0 | 6.0 | 2.0 | 2.1 | A | A |
| | 34 | Pigment dispersion liquid 1 | 30.0 | 30 | 3.0 | 6.0 | 2.0 | 2.4 | A | A |
| | 35 | Pigment dispersion liquid 1 | 30.0 | 31 | 3.0 | 6.0 | 2.0 | 2.4 | B | A |
| | 36 | Pigment dispersion liquid 1 | 30.0 | 32 | 3.0 | 6.0 | 2.0 | 2.1 | A | B |
| | 37 | Pigment dispersion liquid 1 | 30.0 | 33 | 3.0 | 6.0 | 2.0 | 2.1 | A | A |
| | 38 | Pigment dispersion liquid 1 | 30.0 | 34 | 3.0 | 6.0 | 2.0 | 2.1 | A | A |
| | 39 | Pigment dispersion liquid 1 | 30.0 | 35 | 3.0 | 6.0 | 2.0 | 2.1 | A | B |
| | 40 | Pigment dispersion liquid 1 | 30.0 | 36 | 3.0 | 6.0 | 2.0 | 2.1 | A | B |
| | 41 | Pigment dispersion liquid 1 | 30.0 | 37 | 3.0 | 6.0 | 2.0 | 2.1 | A | A |
| | 42 | Pigment dispersion liquid 1 | 30.0 | 38 | 3.0 | 6.0 | 2.0 | 2.1 | A | A |
| | 43 | — | — | 9 | 0.0 | 6.0 | — | 2.1 | B | A |
| | 44 | C.I. Direct Blue 199 | 3.0 | 9 | 0.0 | 6.0 | — | 2.1 | B | A |
| Comparative Example | 1 | Pigment dispersion liquid 1 | 30.0 | — | 3.0 | 0.0 | 0.0 | 2.0 | C | A |
| | 2 | Pigment dispersion liquid 1 | 30.0 | 45 | 3.0 | 6.0 | 2.0 | 2.9 | C | A |
| | 3 | Pigment dispersion liquid 1 | 30.0 | 46 | 3.0 | 6.0 | 2.0 | 2.9 | C | A |
| | 4 | Pigment dispersion liquid 1 | 30.0 | 39 | 3.0 | 6.0 | 2.0 | 2.9 | A | C |
| | 5 | Pigment dispersion liquid 1 | 30.0 | 40 | 3.0 | 6.0 | 2.0 | 2.1 | A | C |
| | 6 | Pigment dispersion liquid 1 | 30.0 | 41 | 3.0 | 6.0 | 2.0 | 2.1 | A | C |
| | 7 | Pigment dispersion liquid 1 | 30.0 | 42 | 3.0 | 6.0 | 2.0 | 2.1 | A | C |
| | 8 | Pigment dispersion liquid 1 | 30.0 | 43 | 3.0 | 6.0 | 2.0 | 2.1 | A | C |
| | 9 | Pigment dispersion liquid 1 | 30.0 | 44 | 3.0 | 6.0 | 2.0 | — | — | — |
| | 10 | Pigment dispersion liquid 1 | 30.0 | 47 | 3.0 | 6.0 | 2.0 | 2.1 | B | C |
| | 11 | Pigment dispersion liquid 1 | 30.0 | 48 | 3.0 | 6.0 | 2.0 | 2.1 | B | C |

According to the present invention, it is possible to provide an aqueous ink having excellent ejection stability and capable of recording an image having excellent abrasion resistance, and a method for preparing the aqueous ink. In addition, according to another exemplary embodiment of the present invention, it is possible to provide an ink cartridge using the aqueous ink and an ink jet recording method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An aqueous ink for ink jet comprising a resin particle, wherein the resin particle is formed of a first resin and a second resin, each having a carboxylic acid group,
the first resin is a polyester resin having no crosslinked structure, the second resin is at least one of a polyester resin and an acrylic resin having a crosslinked structure, and the crosslinked structure for the first resin and the second resin is an alkylene oxide group having a repetition number of 1 to 9.

2. The aqueous ink according to claim 1, wherein an amount of carboxylic acid groups present on a particle surface of the resin particle is 25 µmol/g or more to 250 µmol/g or less.

3. The aqueous ink according to claim 1, wherein a proportion (% by mass) of the second resin in the resin forming the resin particle is 30% by mass or more to 80% by mass or less based on a total mass of the resin.

4. The aqueous ink according to claim 1, wherein the resin particle contains a compound represented by Formula (1),

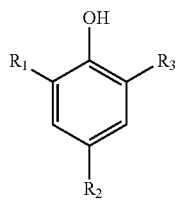

(1)

in the Formula (1), $R_1$, $R_2$ and $R_3$ each independently represent a hydrogen atom or an alkyl group having 1 to 4 carbon atoms.

5. The aqueous ink according to claim 4, wherein a proportion (ppm) of the compound represented by the Formula (1) in the resin particle is 100 ppm or more to 1,000 ppm or less based on a total mass of the resin particle.

6. The aqueous ink according to claim 1, wherein a volume-based cumulative 50% particle diameter of the resin particle is 50 nm or more to 200 nm or less.

7. The aqueous ink according to claim 1, wherein a ratio (times) of a volume-based cumulative 50% particle diameter of the resin particle with respect to a volume-based cumulative 90% particle diameter of the resin particle is 0.6 times or more.

8. An ink cartridge comprising:
an ink; and
an ink storage portion that stores the ink,
wherein the ink comprises the aqueous ink according to claim 1.

9. An ink jet recording method comprising:
ejecting an ink from an ink jet recording head to record an image on a recording medium,
wherein the ink comprises the aqueous ink according to claim 1.

10. A method for producing an aqueous ink for ink jet containing a resin particle, the method comprising:
producing a resin particle; and
mixing the resin particle obtained in the producing of the resin particle and other ink components to produce an aqueous ink, wherein the producing of the resin particle has
(1) reacting a polycarboxylic acid with a polyhydric alcohol to synthesize a first resin which is a polyester resin having a carboxylic acid group, and
(2) in the presence of the polyester resin having a carboxylic acid group and, as necessary, a monomer as a raw material for an acrylic resin,
(2-1) crosslinking the carboxylic acid group with a compound having both an alkylene oxide group having a repetition number of 1 to 9 and two or more glycidyl groups to synthesize a second resin having a carboxylic acid group, thereby obtaining a resin particle in which the first resin is a polyester resin not having a crosslinked structure and the second resin is at least one of a polyester resin and an acrylic resin having a crosslinked structure, or
(2-2) polymerizing the monomer as the raw material for the acrylic resin with a monomer having both an alkylene oxide group having a repetition number of 1 to 9 and two or more ethylenically unsaturated bonds to synthesize a second resin having a carboxylic acid group, thereby obtaining a resin particle in which the first resin is a polyester resin not having a crosslinked structure and the second resin is an acrylic resin having a crosslinked structure.

11. The aqueous ink according to claim 1, wherein the content (% by mass) of the resin particle in the ink is 0.1% by mass or more to 15.0% by mass or less based on the total mass of the ink.

12. The aqueous ink according to claim 1, wherein the content (% by mass) of the resin particle in the ink is 1.0% by mass or more to 10.0% by mass or less based on the total mass of the ink.

13. The aqueous ink according to claim 1, wherein the polyester resin further comprises a unit having an aromatic group.

14. The aqueous ink according to claim 13, wherein the proportion (% by mass) of the unit having an aromatic group in the polyester resin is 25% by mass or more to 50% by mass or less based on the total mass of the resin.

15. The aqueous ink according to claim 1, wherein a volume-based cumulative 90% particle diameter of the resin particle is 80 nm or more to 300 nm or less.

16. The aqueous ink according to claim 1, wherein a ratio (times) of a volume-based cumulative 50% particle diameter of the resin particle with respect to a volume-based cumulative 90% particle diameter of the resin particle is 0.8 times or less.

17. The aqueous ink according to claim 1, wherein the second resin is an acrylic resin having a carboxylic acid group.

18. The aqueous ink according to claim 17, wherein the acrylic resin further comprises a unit having an aromatic group.

19. The aqueous ink according to claim 18, wherein the proportion (% by mass) of the unit having an aromatic group in the acrylic resin is 25% by mass or more to 50% by mass or less based on the total mass of the resin.

20. The aqueous ink according to claim 1, wherein the resin particle is formed only of the first resin and the second resin.

* * * * *